US009786072B2

(12) United States Patent
Matange et al.

(10) Patent No.: US 9,786,072 B2
(45) Date of Patent: Oct. 10, 2017

(54) TECHNIQUES FOR VISUALIZATION OF DATA

(71) Applicant: SAS Institute Inc., Cary, NC (US)

(72) Inventors: Sanjay Matange, Cary, NC (US); Lingxiao Li, Cary, NC (US); Cleester Daniel Heath, IV, Cary, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 14/731,298

(22) Filed: Jun. 4, 2015

(65) Prior Publication Data

US 2015/0310648 A1    Oct. 29, 2015

Related U.S. Application Data

(63) Continuation of application No. 14/696,316, filed on Apr. 24, 2015, now abandoned.

(60) Provisional application No. 61/983,522, filed on Apr. 24, 2014.

(51) Int. Cl.
*G06T 11/20* (2006.01)
*G06Q 10/00* (2012.01)

(52) U.S. Cl.
CPC ............ *G06T 11/206* (2013.01); *G06Q 10/00* (2013.01)

(58) Field of Classification Search
CPC ................................ G06T 11/20; G06T 11/206
See application file for complete search history.

(56) References Cited

U.S. PATENT DOCUMENTS

| 5,563,995 | A | 10/1996 | Shirouzu |
| 5,689,627 | A | 11/1997 | Arai et al. |
| 5,710,578 | A | 1/1998 | Beauregard et al. |
| 6,504,543 | B1 | 1/2003 | Okamoto et al. |
| 6,542,151 | B1 | 4/2003 | Minami et al. |
| 6,597,368 | B1 | 7/2003 | Arai et al. |
| 6,977,652 | B2 | 12/2005 | Senda et al. |
| 8,284,192 | B2 | 10/2012 | Phillips |
| 8,331,734 | B2 | 12/2012 | Wakayama |
| 8,456,474 | B2 | 6/2013 | Onizawa |
| 8,514,229 | B2 | 8/2013 | Cervelli et al. |
| 2009/0142002 | A1 | 6/2009 | Middendorf |
| 2010/0325148 | A1 | 12/2010 | Anderson |
| 2011/0141118 | A1* | 6/2011 | Cardno et al. ............... 345/441 |

(Continued)

OTHER PUBLICATIONS

John Walkenbach, "Excel 2010 Bible", ISBN 9780470474877, 2010.*

(Continued)

*Primary Examiner* — Weiming He
(74) *Attorney, Agent, or Firm* — Kilpatrick Townsend & Stockton LLP

(57) ABSTRACT

A geometric plot is generated having at least two axes, wherein a dataset from which the plot will be generated specifies at least one shape for the geometric plot and wherein the plot includes at least one axis having a plurality of discrete, categorical index values. At least one offset value is specified that determines a mapping of one or more shape-defining vertices of the at least one shape to a location that is a fractional distance between two of the discrete, categorical index values, such that a generated set of data specifies a pixel location for each of the shape-defining vertices of the at least one shape.

36 Claims, 23 Drawing Sheets
(17 of 23 Drawing Sheet(s) Filed in Color)

(56) References Cited

U.S. PATENT DOCUMENTS

2015/0310647 A1    10/2015  Matange et al.

OTHER PUBLICATIONS

Code for bar chart example, retrieved from https://philogb.github.io/jit/static/v20/Jit/Examples/BarChart/example1.code.html on Nov. 1, 2015.*

SAS/GRAPH® 9.2 Graph Template Language Reference, Second Edition, 2010.*

Alesandra Blakeston, "Create an arrow chart", posted on Mar. 22, 2013, retrieved from https://alesandrab.wordpress.com/2013/03/22/create-an-arrow-chart/ on Apr. 18, 2016.*

Jon Peltier, "How to Make Arrow Charts in Excel", posted on Jun. 27, 2012, retrieved from http://peltiertech.com/arrow-charts-in-excel/ on Apr. 18, 2016.*

Calendar basics applies to Outlook 2013, retrieved from https://support.office.com/en-us/article/Calendar-basics-ff69e5c9-3412-4e12-8b10-4943e17b156b?ui=en-US&rs=en-US&ad=US.*

Davo, Making a heatmap with R, retrieved from http://davetang.org/muse/2010/12/06/making-a-heatmap-with-r/ on Nov. 30, 2016.*

Moonheadsing, from OUT table to HEATMAP!, retrieved from https://www.r-bloggers.com/from-otu-table-to-heatmap/ on Nov. 30, 2016.*

Adobe® Flash® Professional CC, Jan. 2014, 943 pages.

SAS Institute Inc. "Doing More with SAS/Assist 9.1" SAS Documentation (Jul. 2003) 7 pages.

SAS Institute Inc. "Graphics Samples Output Gallery", retrieved Nov. 3, 2015 from http://support.sas.com/sassamples/graphgallery/PROC_GCHART_Graph_Types_Charts_Pie.html 4 pages.

SAS Institute Inc. "Tech Support's SAS/Graph Examples, Updated for v9.2!" retrieved Nov. 3, 2015 from http://robslink.com/SAS/democd45/aaaindex.htm 3 pages.

Matange, Sanjay "Graphically Speaking—How about some pie?" posted on website Aug. 26, 2012 http:I/blogs.sas.com/content/graphicallyspeaking/2012/08/26/how-about-some-pie 10 pages.

Non-Final Office Action dated Nov. 25, 2015 for U.S. Appl. No. 14/696,316; 20 pages.

* cited by examiner

TECHNIQUES FOR VISUALIZATION OF DATA

CROSS-REFERENCE TO RELATED APPLICATIONS

The present disclosure is a continuation of U.S. Ser. No. 14/696,316 filed Apr. 24, 2015 by inventors Sanjay Matange, et al., that claims the benefit of priority under 35 U.S.C. §119(e) to U.S. Provisional Application No. 61/983,522 filed Apr. 24, 2014 and titled "Techniques for Visualization of Data", by inventors Sanjay Matange, et al., the entirety of which is incorporated herein by reference.

TECHNICAL FIELD

The present disclosure generally relates to computer-implemented systems and methods for generating visual data presentations, data analysis, and data management in response to user requests.

BACKGROUND

Graphs are used to display data and assist in data analysis in many fields, for example, statistical analysis of data sets. Many techniques for generating graphs in connection with statistical analysis require the user to manually create graphs for the data set. In addition, the user may be required to determine what graph types are desirable as well as what particular variables of the data set to utilize.

SUMMARY

In accordance with the teachings provided herein, systems and methods for automated generation of graphs related to a data set are provided.

The disclosure provides a graphing computer system comprising a processor and a non-transitory computer-readable storage medium that includes instructions that are configured to be executed by the processor such that, when executed, the instructions cause the graphing computer system to perform operations including receiving a request at the graphing computer system to generate a geometric plot having at least two axes, wherein the request specifies a dataset from which the system will generate at least one shape for the geometric plot, and wherein the request specifies at least one axis of the plot having a plurality of discrete, categorical index values, and wherein the dataset of the request specifies at least one offset value that determines a mapping of one or more shape-defining vertices of the at least one shape to a location that is a fractional distance between two of the discrete, categorical index values generating a set of data in accordance with the received request such that the generated set of data specifies a pixel location for each of the shape-defining vertices of the at least one shape, and providing the generated set of data to a graphing engine configured to render the set of data and generate the geometric plot on a display of the graphing computer system.

The disclosure further provides a graphing computer system, wherein the dataset comprises a table of alphanumeric data.

The disclosure further provides a graphing computer system, wherein at least one of the specified pixel locations in the generated set of data is a relative location on the display of the graphing computer system.

The disclosure further provides a graphing computer system, wherein the categorical index values comprise values that are non-numerical.

The disclosure further provides a graphing computer system, wherein the dataset of the request specifies a plurality of polygons for the geometric plot.

The disclosure further provides a graphing computer system, wherein the dataset of the request specifies an angle of rotation for at least one polygon of the geometric plot.

The disclosure further provides a graphing computer system, wherein the dataset of the request specifies an angle of rotation for each polygon of the geometric plot that is independent of the remaining polygons of the geometric plot.

The disclosure further provides a graphing computer system, wherein the generated set of data comprises data that specifies fill information of the shape in the geometric plot that is illustrated on the display of the graphing computer system after rendering.

The disclosure further provides a graphing computer system, wherein the shape of the generated geometric plot comprises a rectangular polygon.

The disclosure further provides a graphing computer system, wherein the received request specifies an alphanumeric label associated with the shape.

The disclosure further provides a graphing computer system, wherein the received request includes a dataset that defines a shape comprising a plurality of polygons that are illustrated on the display of the graphing computer system after rendering.

The disclosure further provides a graphing computer system, wherein the geometric plot includes a first axis and a second axis that is perpendicular to the first axis, and wherein both the first axis and the second axis have discrete, categorical index values.

The disclosure further provides a graphing computer system, wherein the set of data is generated in response to a plurality of requests to generate a geometric plot, and wherein the graphing engine is further configured such that the generated geometric plot includes all the shapes specified in the plurality of requests.

The disclosure further provides a graphing computer system, wherein at least one of the shapes specified in the plurality of requests comprises a heat map.

The disclosure further provides a graphing computer system, wherein the heat map illustrates a plurality of data values that provide a visualization of data that comprises response data, and the shapes of the heat map comprise a plurality of polygon shapes for a plurality of categories, such that at least two of the polygon shapes represent different data values having different magnitudes, and the different data values are represented by different corresponding colors.

The disclosure further provides a graphing computer system, wherein the request specifies an angle of rotation for at least one of the polygon shapes, and the angle of rotation indicates magnitude of the visualized data.

The disclosure further provides a graphing computer system, wherein at least one axis of the geometric plot has discrete, non-numerical index values.

The disclosure further provides a graphing computer system, wherein at least one of the shapes specified in the plurality of requests comprises a spiral heat map.

The disclosure further provides a graphing computer system, wherein at least one of the shapes specified in the plurality of requests comprises a hygrometer plot in which the rendered hygrometer plot provides a visualization of data, wherein the request specifies a dataset and the hygrometer plot comprises a plurality of polygon shapes arranged linearly for each of the categorical values, such that the polygon shapes for a categorical value represent a total sum for the categorical value, and the data processing apparatus calculates display information to define a zero baseline for the hygrometer plot and to define an arrangement of the polygon shapes for each categorical value to place positive value polygon shapes above the zero baseline and to place negative value polygon shapes below the zero baseline.

The disclosure further provides a graphing computer system, wherein at least one of the shapes specified in the plurality of requests comprises a pie chart.

The disclosure further provides a graphing computer system, wherein the pie chart provides a visualization of data, wherein the request specifies a dataset and the pie chart comprises a plurality of pic chart segments, such that the data processing apparatus calculates display information to define a pie chart start angle that is perpendicular to one of the geometric plot axes and to produce an arrangement of the pie chart segments that are symmetric about the start angle.

The disclosure further provides a graphing computer system, wherein the pie chart segments of the pie chart displayed on the display of the data processing apparatus comprise a plurality of segments that are located in a concentric and symmetric arrangement.

The disclosure further provides a method of operating a graphing computer system, the method comprising:
  receiving a request at the graphing computer system to generate a geometric plot having at least two axes, wherein the request specifies a dataset from which the system will generate at least one shape for the geometric plot, and wherein the request specifies at least one axis of the plot having a plurality of discrete, categorical index values, and wherein the dataset of the request specifies at least one offset value that determines a mapping of one or more shape-defining vertices of the at least one shape to a location that is a fractional distance between two of the discrete, categorical index values;
  generating a set of data in accordance with the received request such that the generated set of data specifies a pixel location for each of the shape-defining vertices of the at least one shape; and
  providing the generated set of data to a graphing engine configured to render the set of data and generate the geometric plot on a display of the graphing computer system.

The disclosure also provides corresponding a computer-program product, tangibly embodied in a non-transitory machine-readable storage medium, including instructions configured to be executed to cause a graphing computer system to perform a method that provides the features noted above.

In accordance with the teachings provided herein, systems and methods for graph processing generate a geometric plot having at least two axes, wherein a dataset from which the plot will be generated specifies at least one shape for the geometric plot and wherein the plot includes at least one axis having a plurality of discrete, categorical index values. At least one offset value is specified that determines a mapping of one or more shape-defining vertices of the at least one shape to a location that is a fractional distance between two of the discrete, categorical index values, such that a generated set of data specifies a pixel location for each of the shape-defining vertices of the at least one shape.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Like reference numbers and designations in the various drawings indicate like elements.

DETAILED DESCRIPTION

This application discloses a graphing computer system and associated techniques for data visualization, including a plot statement, such as the "POLYGONPLOT" statement disclosed herein, and extensions of bar chart and pie chart representations. The system processes a request for a geometric plot by generating a graph having at least two axes, where the request relates to a dataset from which the graph will be generated and specifies at least one geometric shape for the geometric plot. The generated plot includes at least one axis having multiple discrete, categorical index values. At least one offset value is specified that determines a mapping of one or more shape-defining vertices of the at least one shape to a location that is a fractional distance between two of the discrete, categorical index values, such that a generated set of data specifies a pixel location for each of the shape-defining vertices of the at least one shape. More particularly, the data set contains observations of data values, and the computer graphing system maps the data values to geometric shapes and draws the shapes relative to a graph of the data values. The data-to-shape mapping may be relatively direct, such as in the case of the plot statement, illustrated as the "PolygonPlot" statement discussed further below. In other situations, as in the PieChart and BarChart discussed further below, the data-to-shape mapping may not be so direct, and a summarization operation may be performed before the data-to-shape mapping is generated.

In one embodiment, the data visualization techniques utilized in the system present a chart comprising a commonly used heat map with an additional indicator to help decode the data when pure color mapping is not sufficient due to either fine color change or color blindness on the part of a person viewing the chart.

The data visualization techniques may be provided in a computer graphing system in which processes to produce the display features are invoked using a graphing request to generate a geometric plot having at least two axes. For example, in a system that supports graphing techniques in accordance with applications software from SAS Institute Inc. ("SAS") of Cary, N.C., USA, the display features may be provided through a "polygonplot" statement, in which a geometric plot is generated having at least two axes and at least one shape. For example, the geometric plot may be produced by generating a set of data that specifies a pixel location for vertices of the at least one shape and by rendering the generated set of data.

Figure 1:
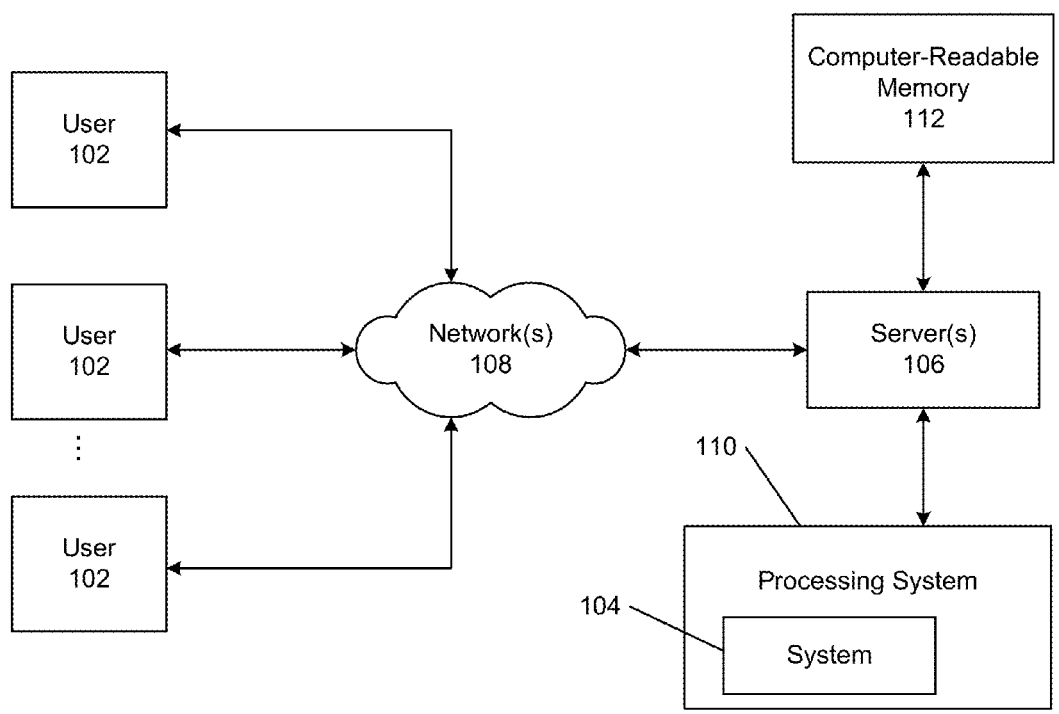
FIG. 1 illustrates a block diagram of an example of a computer-implemented environment for generating, by a graph generation engine, one or more graphs related to a data set.

FIG. 1 illustrates a block diagram of an example of a computer-implemented environment 100 for generating transaction scores related to financial transactions involving a customer account. Users 102 can interact with a computer system 104 through a number of ways, such as one or more servers 106 over one or more networks 108. The computer system 104 can contain software operations or routines. That is, the servers 106, which may be accessible through the networks 108, can host the computer system 104 in a client-server configuration. The computer system 104 can also be provided on a stand-alone computer for access by a user. The users may include, for example, a person at a terminal device who is submitting a request for graphing operations in support of statistical analysis of a data set.

In one example embodiment, the computer-implemented environment 100 may include a stand-alone computer architecture where a processing system 110 (e.g., one or more computer processors) includes the computer system 104 on which the processing system is being executed. The processing system 110 has access to a computer-readable memory 112. In another example embodiment, the computer-implemented environment 100 may include a client-server architecture, and/or a grid computing architecture. Users 102 may utilize a personal computer (PC) or the like to access servers 106 running a computer system 104 on a processing system 110 via the networks 108. The servers 106 may access a computer-readable memory 112.

Figure 2:
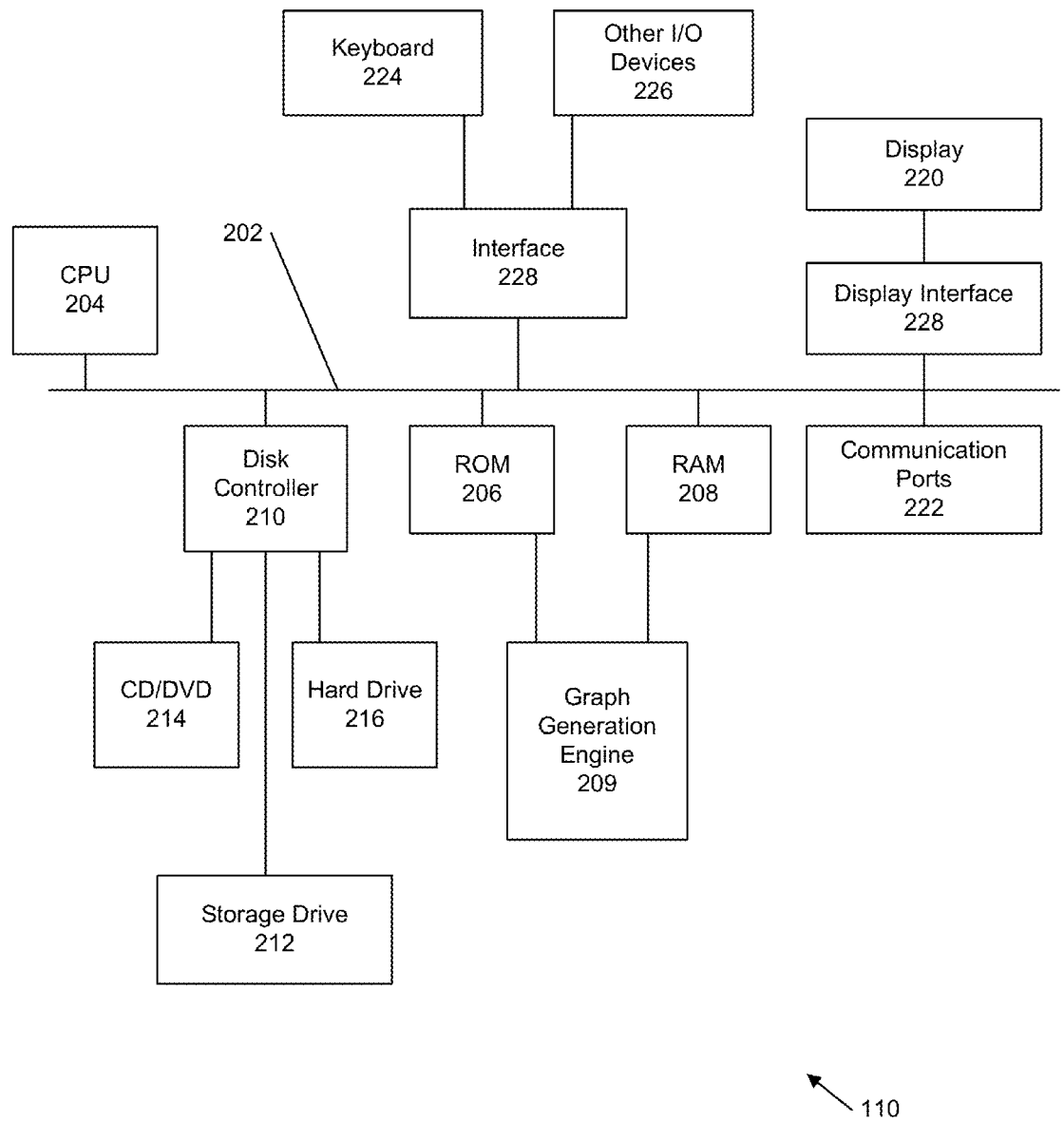
FIG. 2 illustrates a block diagram of an example of a computer processing system of FIG. 1 for generating, by a graph generation engine, one or more graphs related to a data set.

FIG. 2 illustrates a block diagram of an example of a processing system of FIG. 1 for generating transaction scores related to financial transactions involving a customer account. A bus 202 may interconnect the other illustrated components of the processing system 110. A central processing unit (CPU) 204 (e.g., one or more computer processors) may perform calculations and logic operations used to execute a program. A processor-readable storage medium, such as read-only memory (ROM) 206 and random access memory (RAM) 208, may be in communication with the CPU 204 and may contain one or more programming instructions. Optionally, program instructions may be stored on a computer-readable storage medium, such as a magnetic disk, optical disk, recordable memory device, flash memory, or other physical storage medium. Computer instructions may also be communicated via a communications transmission, data stream, or a modulated carrier wave. In one example, program instructions implementing a transaction processing engine 209, as described further in this description, may be stored on storage drive 212, hard drive 216, read only memory (ROM) 206, random access memory (RAM) 208, or may exist as a stand-alone service external to the stand-alone computer architecture.

A disk controller 210 can interface one or more optional disk drives to the bus 202. These disk drives may be external or internal floppy disk drives such as storage drive 212, external or internal CD-ROM, CD-R, CD-RW, or DVD drives 214, or external or internal hard drive 216. As indicated previously, these various disk drives and disk controllers are optional devices.

A display interface 218 may permit information from the bus 202 to be displayed on a display 220 in audio, graphic, or alphanumeric format. Communication with external devices may optionally occur using various communication ports 222. In addition to the standard computer-type components, the hardware may also include data input devices, such as a keyboard 224, or other input/output devices 226, such as a microphone, remote control, touchpad, keypad, stylus, motion, or gesture sensor, location sensor, still or video camera, pointer, mouse or joystick, which can obtain information from bus 202 via interface 228.

As described herein, a computer graphing system configured in accordance with this disclosure can process geometric data values that specify geometric shapes for a graph and are positioned in the graph with respect to categorical data values, and that are further adjusted in position by offset data values relative to a horizontal axis (e.g., X-axis) or a vertical axis (e.g. Y-axis) of the graph. The categorical values are integral values aligned with alphanumeric category names that are indexed along the horizontal axis or vertical axis of the graph. That is, integral index locations along an axis are specified by alphanumeric category names. The offset data values are numeric values between 0 and 1, and are used to specify positions that are located between the integral category name index marks. For example, an offset value of 0.5 (i.e., ½) specifies a position that is half-way between a selected category name (index mark) and the next (adjacent) index mark. The offset data values are part of the data set but are plotted adjacent the graph in columns of their own, as companion(s) of the column(s) that define the X- and/or Y-coordinate of the geometric shape vertex.

A different offset data value is specified for each polygon shape depicted in a graph. The offset data value is generally specified as a category name plus an offset value, such as "A+0.5" or "A−0.5", where the +/−0.5 is understood to refer to the proportional location between the specified category value, "A", and the next adjacent category value in the specified positive or negative direction (right or left, up or down, respectively). Thus, the offset data values define vertices and otherwise specify size and position of the geometric shape that is located between the category name values (index marks) on the display screen. If desired, additional parameters may be included in the data request, such as rotation angles of the shapes. With such additional parameters, it is possible to generate a graph that includes a geometric plot based on a data set that contains discrete categorical values, offset adjustment, and per-polygon screen rotation angles.

In accordance with the description herein, a single request for a geometric plot specifies a data set having data values from which a graph will be plotted relative to a horizontal axis and a vertical axis. The request also specifies at least one shape and its location relative to category names at index marks of one of the axes, with the shape location specified by an offset value relative to a category name index mark. A rotation angle may be optionally included, for a specified shape that is capable of rotation, to specify a rotation of the shape relative to a default orientation. In this way, a single request can be processed to produce a desired geometric plot relative to category name index marks, without necessity of tedious specification of exact pixel values and explicit graphing instructions to produce the desired geometric plot.

Figure 3:
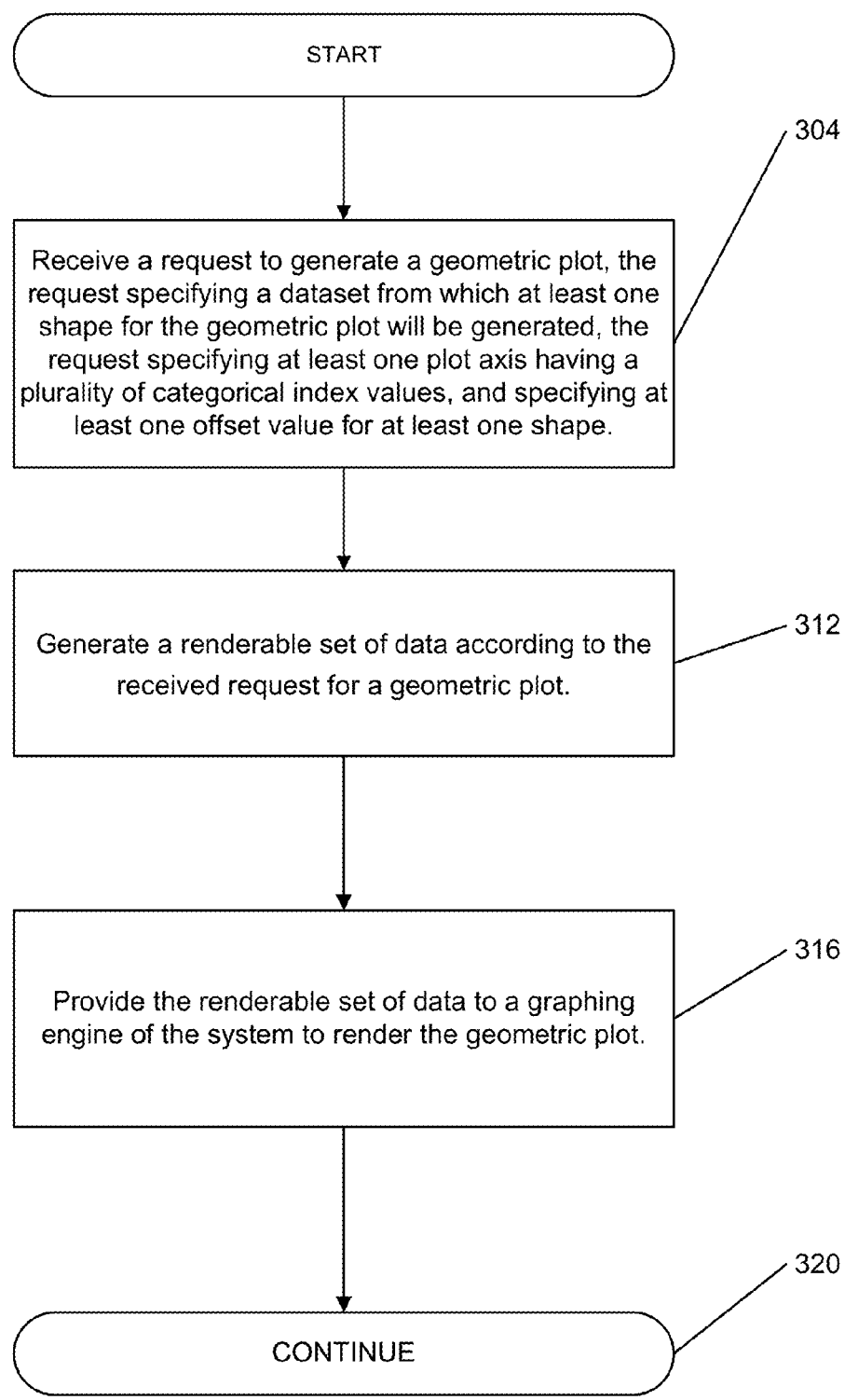
FIG. 3 illustrates an example of a flow diagram for generating, by a graph generation engine, a number of graphs related to a data set.

FIG. 3 illustrates an example of a flow diagram for generating, by a graph generation engine, a number of graphs related to a data set in accordance with the description herein. In the first operation of the graphing computer system, represented by the flowchart box 304, the system receives a request to generate a geometric plot having at least two axes. The geometric plot may include, for example, a polygon plot comprising a variation on a heat map or a spiral heat map, or may include a plot that may be generated with visualization techniques for improved understanding, such as a hygrometer plot or a pie chart. The request specifies a dataset from which the system will generate at least one shape for the geometric plot. The request also specifies at least one axis of the plot having a plurality of discrete, categorical index values, and at least one offset value is specified that determines a mapping of one or more shape-defining vertices of the at least one shape to a location that is a fractional distance between two of the discrete, categorical index values.

In the next operation, indicated by the flowchart box 312, the system generates a set of data in accordance with the received request, such that the generated set of data specifies a pixel location for each of the shape-defining vertices of the at least one shape such that the pixel location is directly renderable by the computer graphing system.

In the next operation, indicated by the flowchart box 316, the system provides the generated set of data to a graphing engine configured to render the set of data and generate the geometric plot on a display of the graphing computer system. The geometric plot includes a first axis and a second axis that is perpendicular to the first axis, and at least one of the first axis and the second axis have discrete, categorical index values. For example, the categorical index values may be values that are non-numerical, such as category names.

The operation of the system to produce a graph display comprising a geometric plot may be summarized by the operations specified by the pseudocode listed in TABLE 1 below:

TABLE 1

Obtain data for a geometric plot having at least two axes and at least one shape.
Generate a set of data that specifies a pixel location for vertices of the at least one shape.
Render the generated set of data to generate the geometric plot on a display.

Program code for the TABLE 1 operations may be specified at a user computer terminal of the system via a command line interface or a graphical user interface. Examples of command line code for illustrated graph displays are provided below in accordance with applications software and graphing systems from SAS Institute Inc. as mentioned above. Those skilled in the art will understand how to implement such code in graphing systems and will understand how to specify and implement corresponding code that would be used in similar graphing systems.

Figure 4:
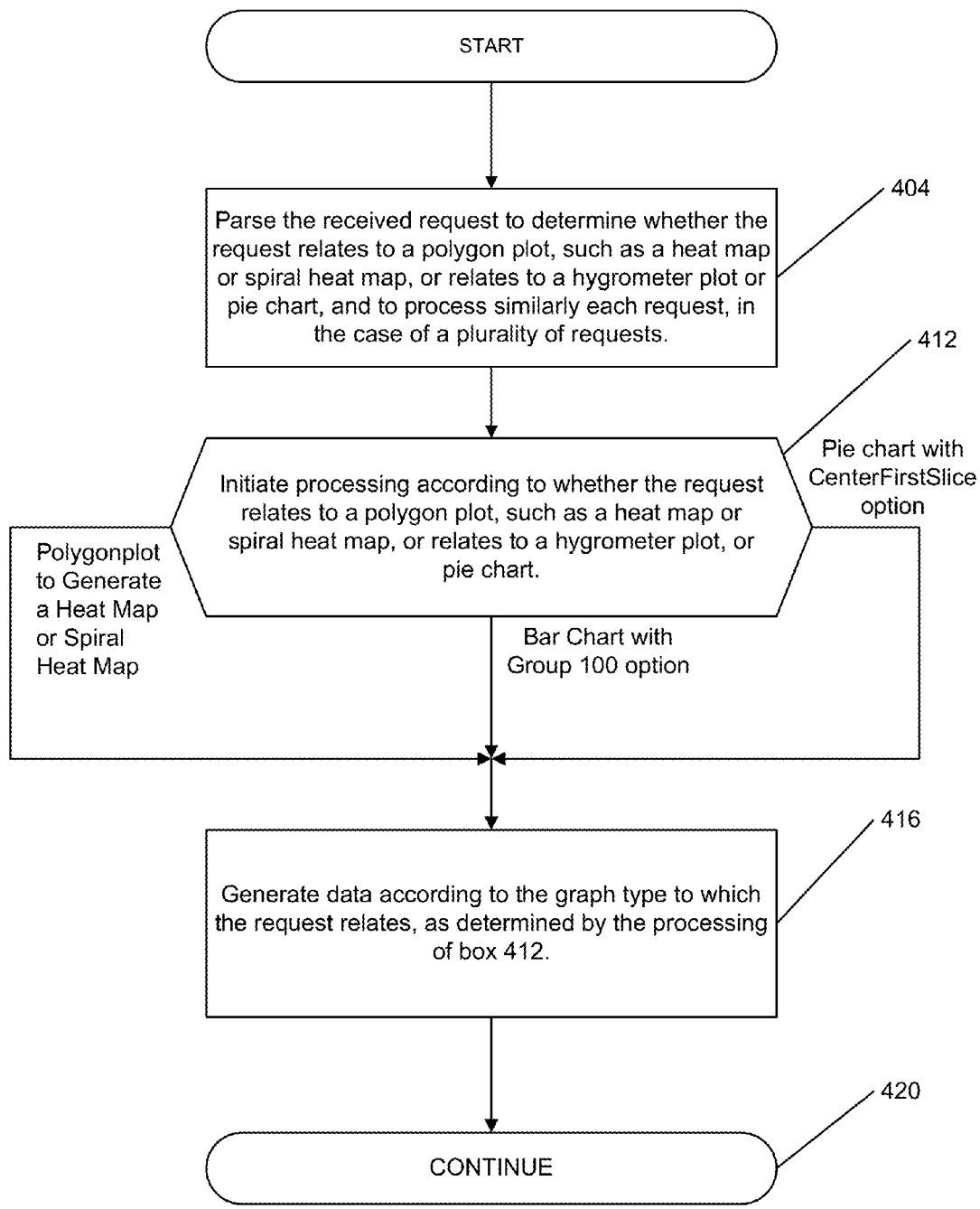
FIG. 4 illustrates another example of a flow diagram for generating, by a graph generation engine, a number of graphs related to a data set.

FIG. 4 illustrates processing corresponding to the box 304 of FIG. 3. That is, FIG. 4 illustrates additional processing details of the graphing request received by the system. Such processing may be represented by the program code provided in the various tables of code disclosed in this document. As noted above, the request received by the system may include a request for a polygon plot, such as a heat map or spiral heat map, or the request may include a request for a plot that may be susceptible of visualization techniques for improved interpretation, such as a request for a hygrometer plot or pie chart. In the first illustrated operation of FIG. 4, represented by the box 404, the system receives the request and parses the request to determine whether the request relates to a polygon plot, such as a heat map or spiral heat map, or relates to a visualization plot such as a hygrometer plot or pie chart. The system may receive a plurality of graphing requests, when plots or shapes or both will be combined to generate the geometric plot. In such a case, the graphing system is further configured such that the generated geometric plot includes all the shapes specified in the plurality of requests.

In the next operation, represented by the decision box 412, the system initiates processing according to whether the request relates to a polygon plot such as a heat map or spiral heat map, or relates to a plot that incorporates visualization techniques, such as a hygrometer plot or pie chart. For each particular type of requested graph, the system generates data according to the requested type of graph, as represented by the box 416. System operation continues with additional processing, as indicated by the continuation box 420.

Figure 5:
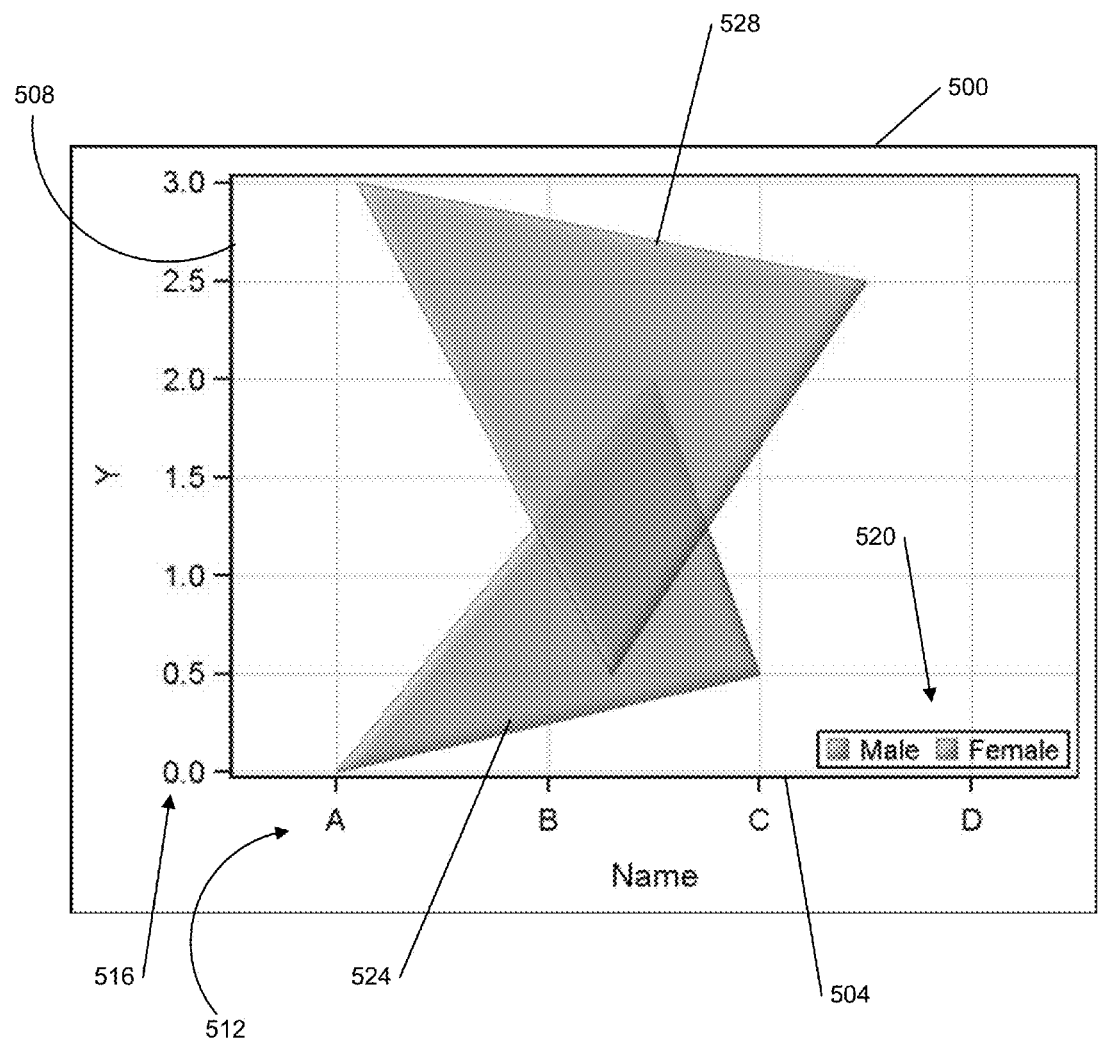
FIG. 5 illustrates an example of a display of the FIG. 1 computer processing system on which a graph is generated.

FIG. 5 illustrates an example of a display of the FIG. 1 computer processing system on which a graph is generated. FIG. 5 comprises a display 500 of the graphing computer system of FIG. 1 that shows a graph having two axes 504, 508. In FIG. 5, the two axes comprise an X-axis 504 identified with categorical index values 512 of A, B, C, and D adjacent the axis, and also a Y-axis 508 identified with numerical index values 516 indicated as 0.0, 0.5, 1.0, 1.5, 2.0, 2.5, and 3.0 adjacent the axis. The numerical index values of the Y-axis indicate a continuous numerical scale along the axis, such that axis values in between any of the index values can be precisely located along the axis. A legend box 520 identifies the geometric shapes illustrated in the graph as corresponding to data that relates to male and female subjects. The geometric shapes in the graph, in this example, are polygon shapes, corresponding to male 524 and female 528 subjects. It should be noted that, because the Y-axis index values correspond to numerical values, the Y-axis index marks of 0.0, 0.5, 1.0, . . . , 3.0 could be specified in a variety of spacing values, rather than as specified in intervals of 0.5 beginning at the origin (zero). The graphing system can handle requests where either arrangement (categorical names or numerical values) are used for either axis.

In the computer graphing system of FIG. 1, a program code statement such as a "POLYGONPLOT" statement can facilitate the relatively convenient creation of graphs such as that of FIG. 5, and as illustrated and described herein. The POLYGONPLOT statement is a non-limiting example of program code that can be processed by the computer graphing system and used to initiate operations in the programming environment of the computer graphing system. For example, in the "Graph Template Language" (GTL) utilized by SAS Institute Inc. of Cary, N.C., a suitable "POLYGONPLOT" statement allows the creation of polygon shapes in the numeric and discrete space as shown in FIG. 5. The polygon shapes may include curved sides that connect two or more vertices of the shapes. The POLYGONPLOT command line statement for FIG. 5 has a general form as in the following TABLE 2 pseudocode that adds to the information provided in TABLE 1 above:

TABLE 2 proc sgplot [data specification];
polygonplot id=id_name x=x_axis_name y=y_axis_name;
xoffset=offset value for a shape relative to the closest discrete axis categorical value (if applicable);
yoffset=offset value for a shape relative to the closest discrete axis categorical value (if applicable);
[options];
run;.

In general, the data specification is in the form of a data=dataset instruction, in which the dataset instruction provides the name of a dataset that is accessible to the computer system, such that the system can retrieve the dataset from storage of the computer system, and can obtain data for a geometric plot having at least two axes and at least one shape and operate on the retrieved dataset to produce a graph. In the general format of the non-limiting program code example of TABLE 2 above, "proc sgplot" is the name given to the procedure of the program code that comprises the request for a geometric plot and initiates the operations that produce the geometric plot. Other suitable procedure names may be used, such as "proc template" or the like. The "proc sgplot" statement above comprises a request to the computer graphing system for a geometric plot, for which the computer graphing system is configured to carry out. The "dataset" is the name of the dataset that contains the graphing specifications that are desired for the graph of the geometric plot; "polygon" includes an identifier "id" that is arbitrary, and includes x and y category value indicators. The parameter "xoffset" is an X-axis offset value and "yoffset" is a Y-axis offset value, such that either an X-axis offset or a Y-axis offset, or both, is specified. If the X-axis index marking is categorical (i.e., discrete), then an X-axis offset value can be specified. If the Y-axis index marking is categorical (i.e., discrete), then a Y-axis offset value can be specified. Thus, the "xoffset" value (or "yoffset" value) can be a constant value (not part of the dataset) or can be specified as a column in the data set. The "options" parameter is an optional way to specify various plotting options that may depend on the system configuration and resources. Such plotting options may include, for example, label locations, label positions, and the like. Such plotting options are illustrated in FIGS. 15-18. Altogether, the data specification, axis names, axis offsets, and options are used by the computer graphing system to generate a set of data that specifies a pixel location for vertices of the at least one shape. The "run" pseudocode statement of TABLE 2 initiates the operations that execute the program code and generate the geometric plot.

As noted above, the GTL of SAS may be used to provide program code that, when executed, will specify graph displays, such as FIG. 5. The GTL of SAS provides an implementation with a command line interface, and can also be implemented and accessed via a GUI presentation on a computer display of the graphing computer system.

In command line format, for example, the operations of TABLE 1 and TABLE 2 may be initiated with a non-limiting example of command line GTL code such as listed in TABLE 3 below to produce the graph plot of FIG. 5:

TABLE 3

%let gpath='.';
%let dpi=200;
ods html close;
ods listing gpath=&gpath image_dpi=&dpi;
/*--Data for 2 triangles--*/
data poly;
　　length Id $6;
　　input Id $ Name $ Offset Y;
　　datalines;
Male A 0.0 0.0
Male B 0.5 2.0
Male C 0.0 0.5
Female B 0.3 0.5
Female A 0.1 3.0
Female D −0.5 2.5
run;
proc print; run;
/*--GTL Template--*/
proc template;
　　define statgraph triangles;
　　　　begingraph;
　　　　　　layout overlay / xaxisopts=(griddisplay=on) yaxisopts=(griddisplay=on);
　　　　　　　　polygonplot id=id x=name y=y / xoffset=offset
　　　　　　　　　　dataSkin=matte fillattrs=(transparency=0.3)
　　　　　　　　　　group=id display=all name='foo';
　　　　　　　　discretelegend 'foo'/ location=inside halign=right valign=bottom;

TABLE 3-continued

```
      end Layout;
    endgraph;
end;
/*--Render the graph--*/
ods graphics / reset width=4in imagename='FIG._5_Triangles';
proc sgrender data=poly template=triangles;
run;
```

In the TABLE 3 program code above, it can be seen that data for two polygon shapes comprising triangles are provided, in the "data poly" section of code. Thus, each triangle includes three vertices. One FIG. 5 triangle corresponds to male data, and the other FIG. 5 triangle corresponds to female data. Another section of the TABLE 3 code comprises a specification of the graph layout, in the "proc template" section of code. The last section of TABLE 3 code initiates the rendering of the graph display, in the "ods graphics" section of code. Those skilled in the art will appreciate that some of the lines of code in TABLE 3, such as format specifications, process calls, and calls to an output display system (ods) and the like, are unique to the operating environment of the SAS system referred to above. Those skilled in the art will understand corresponding code that would be utilized in other graphing systems.

Figure 6:
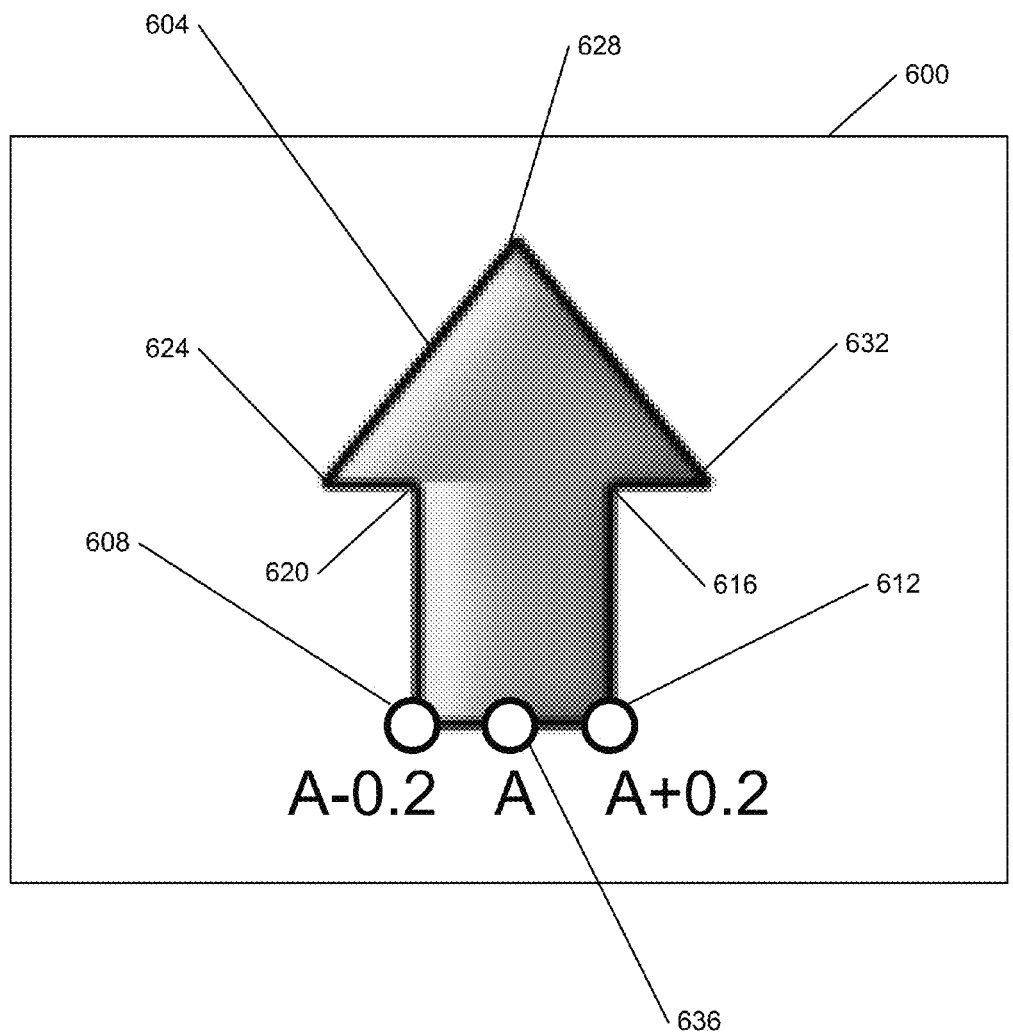
FIG. 6 illustrates an example of a display of the FIG. 1 computer processing system on which a graph is generated.

FIG. 6 illustrates an example of a display 600 of the FIG. 1 computer processing system that shows an example of a graph with a geometric shape 604 of the display. In the FIG. 6 example, the geometric shape 604 comprises an arrowhead. As described further below, the geometric shape is specified by a dataset that is identified in a received graphing request.

The arrowhead 604 is a composite of multiple polygon shapes that may be thought of as including a rectangular shape and a triangular shape. As described further below, however, the data specification of the program code may be used to define the arrowhead shape 604 as an object having vertices 608, 612, 616, 620, 624, 628, 632. The received request specifies the pixel locations for a corresponding one of the vertices of each arrowhead to be plotted in a graph. FIG. 6 illustrates that the location of the arrowhead 604 may be specified relative to a categorical index value "A" along an "X" (horizontal) graph axis, in which the center of the rectangular shape is identified at the point "A" 636, with another of the shape vertices 608 identified as having an offset of negative 0.2 axis units from the "A" point, indicated by A−0.2, and another of the shape vertices 612 identified as having an offset of positive 0.2 axis units indicated by the A+0.2 axis location.

Thus, the arrowhead 604 may be viewed as a single polygon shape made up with seven vertices: 608, 620, 624, 628, 632, 616, and 612. It should be apparent that a Y-coordinate value is also needed to specify each vertex. That is, if the "A" values are understood to be specified along a horizontal (X-axis) line, in the left-right dimension, then vertical (Y-axis) line values also must be specified, to indicate distance from the X-axis line, in the up-down dimension of the illustration. If the Y-axis has discrete, categorical values, then offsets will be specified, as with the X-axis in FIG. 6. If the Y-axis is a numerical axis, then values along the Y-axis may be specifically identified without offset from a discrete value. This is discussed above, in connection with the TABLE 2 discussion.

Figure 7:
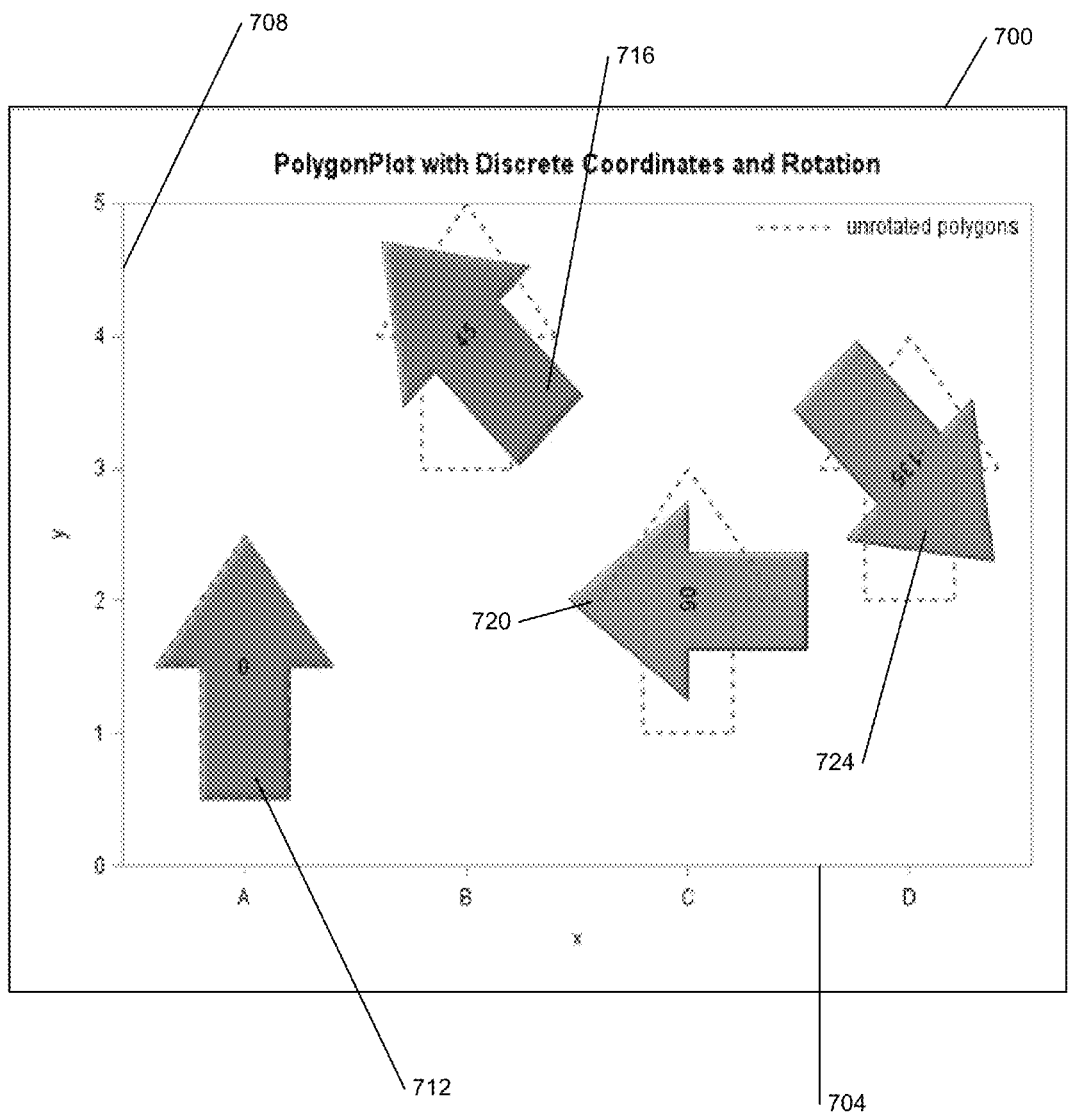
FIG. 7 illustrates an example of a display of the FIG. 1 computer processing system on which a graph is generated.

FIG. 7 illustrates a an example of a display 700 of the FIG. 1 computer processing system that shows an example of a graph with a number of geometric shapes, as described herein. The FIG. 7 display 700 shows an example of a plurality of geometric shapes, which comprise arrowheads such as illustrated in FIG. 6. The FIG. 7 graph includes a graph with a horizontal X-axis 704 and a vertical Y-axis 708 defining a graph area in which four geometric shapes 712, 716, 720, 724 are illustrated. Each of the geometric shapes includes an arrowhead, similar to the arrowhead illustrated in FIG. 6. The illustration of FIG. 7 shows the capability of the computer graphing system to use offsets (in this case, x-offset values) to define vertices of polygons such as illustrated in FIG. 6 to positions located in between the "A", "B", "C", and "D" category names in FIG. 7 that are shown as index markings along the X-axis.

In FIG. 7, each arrowhead 712, 716, 720, 724 is shown rotated independently of the remaining arrowheads. The ability to rotate geometric shapes illustrates the flexibility of the computer graphing system to utilize shape position, size, and orientation to represent data characteristics, if desired. In FIG. 7, the angle of rotation for each arrowhead is indicated by an angle of rotation relative to vertical. A dashed line arrowhead for each of the rotated arrowheads illustrates a vertically-oriented, unrotated arrowhead, to show the relative angle of rotation as appropriate. For example, the first arrowhead 712 is in a vertical orientation and has a zero angle of rotation, whereas the second arrowhead 716 is rotated at an angle that is indicated as 45 degrees from vertical. The third arrowhead 720 is rotated at an angle that is indicated as 90 degrees from vertical. The fourth arrowhead 724 is rotated at an angle that is indicated as −135 degrees from vertical. It should be apparent that the fourth arrowhead rotational position also could be indicated as 225 degrees from vertical. As noted above, rotation of shapes may be used to illustrate characteristics or show more information about data. For example, as described further below, rotation is used in FIG. 8 to show information relating to "Author Popularity" as indicated in the data set. Multiple characteristics may be combined to indicate data features. For example, rotation angle can be additionally made to correspond with color, and the two characteristics together may indicate a data feature.

As noted above, the GTL of SAS may be used to provide program code that, when executed, will specify graph displays, such as FIG. 7. The GTL of SAS provides an implementation with a command line interface, and can also be implemented and accessed via a GUI presentation on a computer display of the graphing computer system. To generate the graph display of FIG. 7, in command line format, for example, the code for generating the graph display may be initiated with the non-limiting example of command line code such as listed in TABLE 4 below to produce the graph plot of FIG. 7:

TABLE 4

```
%let gpath='.';
%let dpi=200;
ods html close;
```

TABLE 4-continued

```
ods listing gpath=&gpath image_dpi=&dpi;
/*--Define the data--*/
data poly;
    input id $ x $ y xoffset rotate;
    datalines;
1 A 2.5 0 0
1 A 1.5 −0.4 0
1 A 1.5 −0.2 0
1 A 0.5 −0.2 0
1 A 0.5 0.2 0
1 A 1.5 0.2 0
1 A 1.5 0.4 0
2 B 5 0 45
2 B 4 −0.4 45
2 B 4 −0.2 45
2 B 3 −0.2 45
2 B 3 0.2 45
2 B 4 0.2 45
2 B 4 0.4 45
3 C 3 0 90
3 C 2 −0.4 90
3 C 2 −0.2 90
3 C 1 −0.2 90
3 C 1 0.2 90
3 C 2 0.2 90
3 C 2 0.4 90
4 D 4 0 −135
4 D 3 −0.4 −135
4 D 3 −0.2 −135
4 D 2 −0.2 −135
4 D 2 0.2 −135
4 D 3 0.2 −135
4 D 3 0.4 −135
;
run;
/*--Define the Template--*/
proc template;
define statgraph FIG._7;
begingraph / pad=20px;
entrytitle "PolygonPlot with Discrete Coordinates and Rotation";
Layout overlay / yaxisopts=(offsetmin=0 offsetmax=0);
barchart category=x response=y / stat=mean datatransparency=1;
polygonplot id=id x=x y=y / rotate=rotate xoffset=xoffset label=rotate
labellocation=insidebbox dataSkin=sheen group=id display=all
labelattrs=(color=black size=9pt);
polygonplot id=id x=x y=y / xoffset=xoffset outlineattrs=(pattern=shortdash
color=gray thickness=2px) name='unrot' legendLabel="unrotated poly-
gons";
discretelegend 'unrot' / border=false location=inside halign=right
valign=top;
endLayout;
endgraph;
end;
run;
/*--Render the graph--*/
ods graphics / reset imagename='FIG._7';
proc sgrender data=poly template=FIG._7;
run;
```

In the TABLE 4 code above, after an initial section in which display and data parameters are provided, it can be seen that a "data poly" section specifies data for the graph display, comprising four polygon shapes. The shapes are positioned in the FIG. 7 display at x-axis locations of A, B, C, and D. Another section of the TABLE 4 code comprises a specification of the graph layout, in the "proc template" section of code. More particularly, in the data of TABLE 4, the seven vertices of a polygon are specified in the data corresponding to each of arrowheads 1, 2, 3, and 4. That is, the arrowhead vertex of the arrowhead 1 at category A, is located at (2.5, 0) with zero rotation angle, and the second vertex is located at (1.5, −0.4), the third vertex is located at (1.5, −0.2), and so forth. The second arrowhead 2 is at category B, with rotation angle 45, the third arrowhead 3 is at category C, with rotation angle 90, and so forth. The last section of TABLE 4 code initiates the rendering of the graph display, in the "ods graphics" section of code. Those skilled in the art will appreciate that some of the lines of code in TABLE 4, such as format specifications, process calls, and calls to an output display system (ods) and the like, are unique to the operating environment of the SAS system referred to above. Those skilled in the art will understand corresponding code that would be utilized in other graphing systems.

Heat Map

Figure 8A:
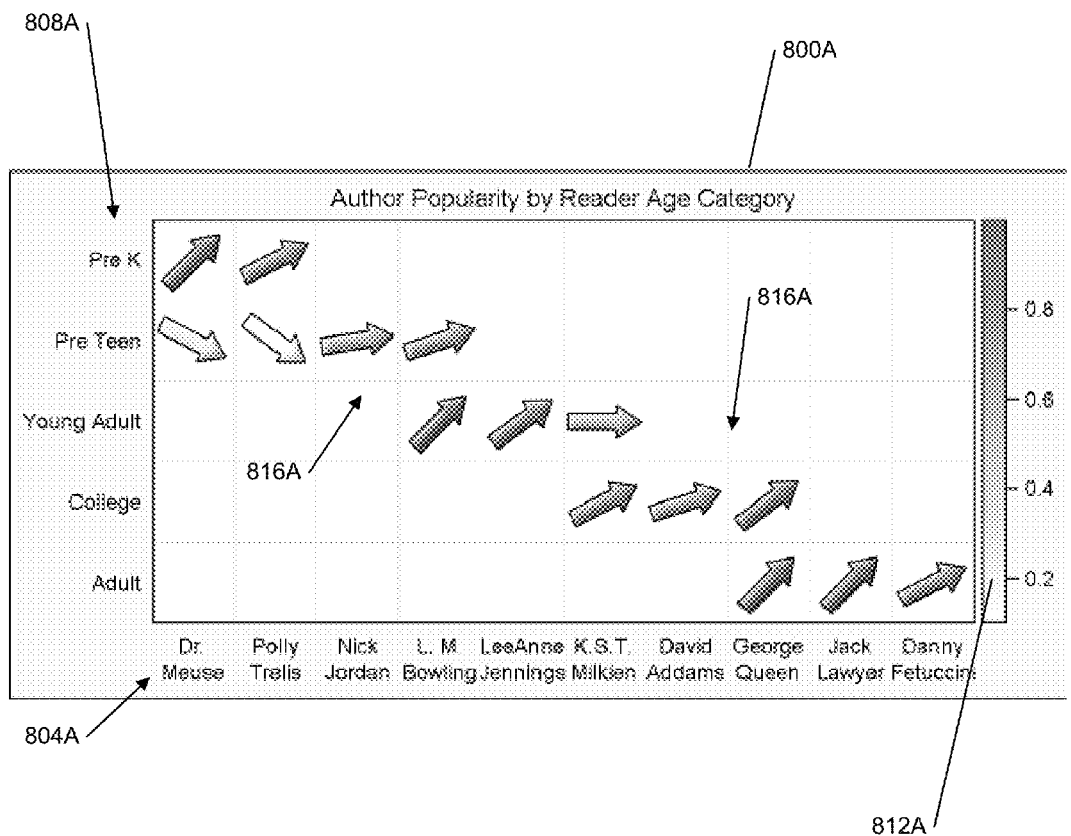
FIG. 8A illustrates an example of a display of the FIG. 1 computer processing system on which a graph is generated.
Figure 8B:
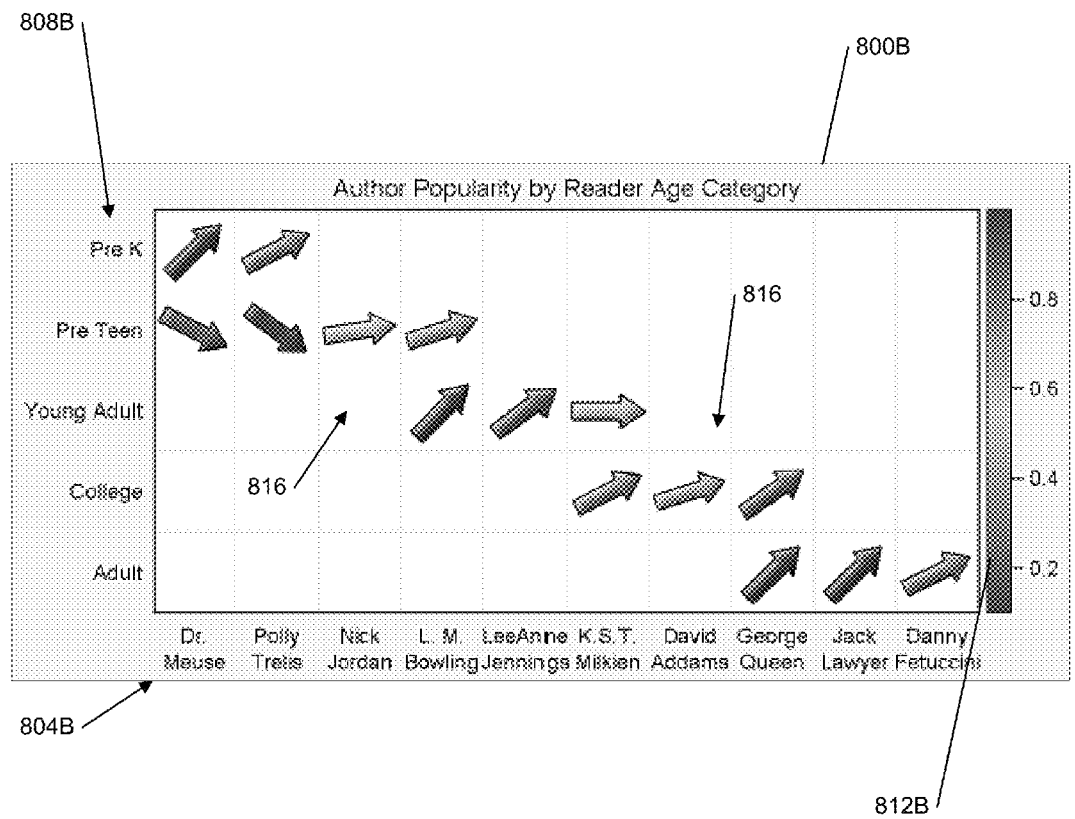
FIG. 8B illustrates an example of a display of the FIG. 1 computer processing system on which a graph is generated.

FIG. 8A illustrates an example of a display 800A of the FIG. 1 computer processing system that shows an example of a graph that, as illustrated, is a variation on a type of graph referred to as a heat map. The dataset represented in a heat map such as that in FIG. 8A includes data values that may be characterized over multiple variables. In FIG. 8A, the dataset variables include author names, reader age categories, and author popularity according to reader age category. The dataset values include a range for each variable, such as indicated in FIG. 8A. For example, the author names variables comprise a set that includes the discrete names 804A shown along the X-axis, the reader age categories variables comprise a set that includes the discrete age groups 808A, shown along the Y-axis, and the author popularity variables comprise values over a range 812A from 0.0 (zero) to 1.0, indicating relative popularity of an author, given an author name and reader age category. That is, FIG. 8A shows that the X-axis and the Y-axis both have discrete, categorical index values, and the arrowhead polygons defined by the dataset indicate a data value represented by a polygon angle of rotation that is a function of the categorical index values of the X-axis and the Y-axis. Thus, the FIG. 8A display 800A of the graphing computer system of FIG. 1 shows an example of a plurality of geometric shapes. FIG. 8B illustrates an example of a display 800B of the FIG. 1 computer processing system that shows the same objects as FIG. 8A, except that FIG. 8B shows a color rendition of the objects. The graph displayed in FIG. 8B illustrates the advantage of using color in the shapes. The objects in the respective drawings have the same reference numerals, wherein the FIG. 8A reference numerals include an "A" suffix and the FIG. 8B reference numerals include a "B" suffix.

In the use case of FIG. 8A, a heat map is used to display the popularity of an author for different segments (e.g., age categories) of readers, the segments being identified by age groups. Category values 804A of fictitious author names are indicated adjacent one axis, the X-axis, and category values 808A of age groups are indicated adjacent the other axis, the Y-axis. The popularity of an author may be represented by position along the vertical index line or column 812A on the right side of FIG. 8A at the data point crossing of the author name and reader age group. The range of values along the vertical column 812A may, in turn, be represented by a graphical feature, such as color or the like. For example, higher values along the column 812A may be represented by the color Green, and lower values may be represented by the color Red, with Yellow shades in the middle range. Numerical values that indicate popularity data according to the vertical column 812A are shown opposite the age groups axis. FIG. 8B provides the same information as shown in FIG. 8A, except that FIG. 8B is a color rendition of FIG. 8A. The graph illustrated in FIG. 8B illustrates the advantage of using color in the shapes and a corresponding color gradient in the vertical column 812B.

The heat map of FIG. 8A provides an efficient display of data values, represented by the arrowheads 816 and their respective angles of rotations. Actual numbers are sometimes displayed in each cell, but this can become less effective when the cells decrease in size, and the text strings for the values become larger. Conventional heat map graphs represent data values not as arrowheads as described herein, but as regular shapes, such as squares or circles, with values indicated by color.

As noted above, the GTL of SAS may be used to provide program code that, when executed, will specify graph displays, such as FIG. 8A and FIG. 8B. The GTL of SAS provides an implementation with a command line interface, and can also be implemented and accessed via a GUI presentation on a computer display of the graphing computer system. To generate the graph display of FIG. 8A and FIG. 8B, in command line format, for example, the code for generating the graph display may be initiated with the non-limiting example command line code such as listed in TABLE 5 below to produce the graph plot of FIG. 8A and FIG. 8B:

TABLE 5

```
%let gpath='.';
%let dpi=200;
ods html close;
ods listing gpath=&gpath image_dpi=&dpi;
title;
footnote;
data Authors;
    input Grade $1-20 Author $21-40 Likelihood;
    datalines;
Pre K              Dr. Meuse              1.0
Pre K              Polly Trelis           0.8
Pre Teen           Dr. Meuse              0.2
Pre Teen           Polly Trelis           0.1
Pre Teen           Nick Jordan            0.6
Pre Teen           L. M. Bowling          0.7
Young Adult        L. M. Bowling          1.0
Young Adult        LeeAnne Jennings       0.9
Young Adult        K.S.T. Milkien         0.5
College            K.S.T. Milkien         0.8
College            David Addams           0.7
College            George Queen           0.9
Adult              George Queen           1.0
Adult              Jack Lawyer            1.0
Adult              Danny Fetuccini        0.8
;
run;
/*proc print;run;*/
data Grid;
    set Authors;
    keep author grade id angle offx offy likelyhood author_pt grade_pt;
    id=_n_;
    angle=45+90*likelihood;
/* angle=180*likelihood;*/
    x1=0.1; x2=0.2; x3=0;
    y1=0.45; y2=0.15; y3=0.45;
    offx=-x1; offy=-y1; output;
    offx=-x1; offy=y2; output;
    offx=-x2; offy=y2; output;
    offx=x3; offy=y3; output;
    offx=x2; offy=y2; output;
    offx=x1; offy=y2; output;
    author_pt =author; grade_pt=grade; offx=x1; offy=-y1; output;
    author_pt =''; grade_pt='';
run;
proc print;run;
proc template;
    define statgraph GradeAuthorGrid;
        begingraph / backgroundcolor=cxf0f0ff;
            entrytitle 'Author Popularity by Reader Age Category';
            layout overlay / xaxisopts=(display=(tickvalues) griddisplay=on
                    offsetmin=0.05 offsetmax=0.05
                    discreteopts=(tickvaluefitpolicy=split ticktype=inbetween))
                yaxisopts=(display=(tickvalues) reverse=true griddisplay=on
                    offsetmin=0.1 offsetmax=0.1
                    discreteopts=(ticktype=inbetween));
            polygonplot x=author y=grade id=id / rotate=angle xoffset=offx yoffset=offy
display=(fill)
                dataskin=sheen colorresponse=likelihood name='a' colormodel=(red
gold green);
                polygonplot x=author y=grade id=id / rotate=angle xoffset=offx
yoffset=offy
                    display=(outline);
                continuouslegend 'a' / halign=right;
            endlayout;
        endgraph;
    end;
run;
ods graphics / reset width=6in height=3in
imagename='FIG._8B_ClassPoly_Arrow';
```

TABLE 5-continued

```
proc sgrender data=Grid template=GradeAuthorGrid;
run;
proc template;
   define statgraph GradeAuthorGrid_Gray;
      begingraph / backgroundcolor=cxf7f7f7;
         entrytitle 'Author Popularity by Reader Age Category';
         layout overlay / xaxisopts=(display=(tickvalues) griddisplay=on
                  offsetmin=0.05 offsetmax=0.05
                  discreteopts=(tickvaluefitpolicy=split ticktype=inbetween))
                yaxisopts=(display=(tickvalues) reverse=true griddisplay=on
                  offsetmin=0.1 offsetmax=0.1
                  discreteopts=(ticktype=inbetween));
         polygonplot x=author y=grade id=id / rotate=angle xoffset=offx yoffset=offy display=(fill)
                  dataskin=sheen colorresponse=likelihood name='a' colormodel=(white gray);
                polygonplot x=author y=grade id=id / rotate=angle xoffset=offx yoffset=offy
                  display=(outline);
         continuouslegend 'a' / halign=right;
         endlayout;
      endgraph;
   end;
run;
ods listing style=journal;
ods graphics / reset width=6in height=3in
imagename='FIG._8_ClassPoly_Arrow_Gray';
proc sgrender data=Grid template=GradeAuthorGrid_Gray;
run;
```

In the TABLE 5 code above, after an initial section in which display and data parameters are provided, it can be seen that a "data Authors" section and a "data Grid" section specifies data for shapes and plot grid, respectively, of the graph display. Another section of the TABLE 5 code comprises a specification of the graph layout, in the "proc template" sections of code. One "proc template" section of code corresponds to the shape data, and the other "proc template" section of code corresponds to the plot grid data. It should be noted that these sections of code include reference to "colormodel" values, which indicate coloring and/or shading to be implemented in the display. The SAS program code accommodates systems that provide both monochrome (grayscale, or black and white) output and color output. That is, the TABLE 5 code will provide a grayscale rendition on monochrome display systems, and the TABLE 5 code will provide a color rendition on display systems that can display color. There is no need for the code programmer to change the code for generating the display, as the processing system 110 and/or server 106 (FIG. 1) will generate the appropriate data for the display. The last section of TABLE 5 code initiates the rendering of the graph display, in the "ods graphics" section of code. It should be noted that code with a "fill" value indicated for a shape may be specified to a zero (i.e., transparent) value, for those shapes that are not intended to be filled, for purposes of the display. Those skilled in the art will appreciate that some of the lines of code in TABLE 5, such as format specifications, process calls, and calls to an output display system (ods) and the like, are unique to the operating environment of the SAS system referred to above. Those skilled in the art will understand corresponding code that would be utilized in other graphing systems.

For a display that is incapable of showing color, or for viewers who cannot discern such colors, the information that is otherwise provided by a color display is lost. In both cases, displays that are incapable of showing color and viewers who cannot discern color, it may be more difficult to discriminate between the high values and the low values in the cells. This same graph can be represented with an additional visual cue to help understand the data, such as the visual cue shown in FIG. 8A, which shows arrowheads 816A of different rotation in accordance with author popularity 812A. That is, when color cannot be perceived due to gray scale printing or inability to discern color, the color values illustrated in FIG. 8B are lost and what is observed is the non-color illustration of FIG. 8A. In such a circumstance, however, the angular values of the arrowheads can still convey the popularity value for each cell, which is otherwise communicated with the aid of color (FIG. 8B).

In a color display, as illustrated in FIG. 8B, in accordance with the system described herein, the response value for an author's popularity is represented by a color mapping, and also by the angle of the arrowhead. In both FIG. 8A and FIG. 8B, the angle of the arrowhead is illustrated from 45° upwards (represented by the color Green) to 45° downwards (represented by the color Red). The angle of the arrowhead provides an additional cue to the reader to the value in each cell, or data point of results, in the absence of color in the display. The program code in TABLE 5 can be used to generate the FIG. 8A display and the FIG. 8B display.

Ordinarily, a user would have to utilize a different color coding technique to address different audiences. Using the technique described herein allows the authors of the graph to create only one graph that can be consumed by a wider audience, independent of color capability. That is, a display that is capable of illustrating color will render the graph in color, such as FIG. 8B, and a display that cannot illustrate color, will use the same code to generate a gray-scale display, such as FIG. 8A.

As noted above, a new POLYGONPLOT statement facilitates the relatively convenient creation of such heat map graphs. For example, in the "Graph Template Language" (GTL) utilized by SAS Institute Inc., a suitable "POLYGONPLOT" statement allows the creation of polygons in the numeric and discrete space.

Specifying points on a polygon typically can be achieved in the numeric space. However, in the graph of FIG. 8A, both axes are identified with categorical values. More particularly, the categorical values comprise alphanumeric characters. Therefore, it is useful to define the polygons defining the arrowheads in discrete or mixed space allowed by the POLYGONPLOT statement, which will also be referred to as a "PolygonPlot" statement. The computer code of TABLE 5 can be provided to the graphing computer system via an input source (e.g., a terminal or user input), may be read from memory, or otherwise provided to the processor, in accordance with the configuration of the system.

Spiral Heat Map

Figure 22:
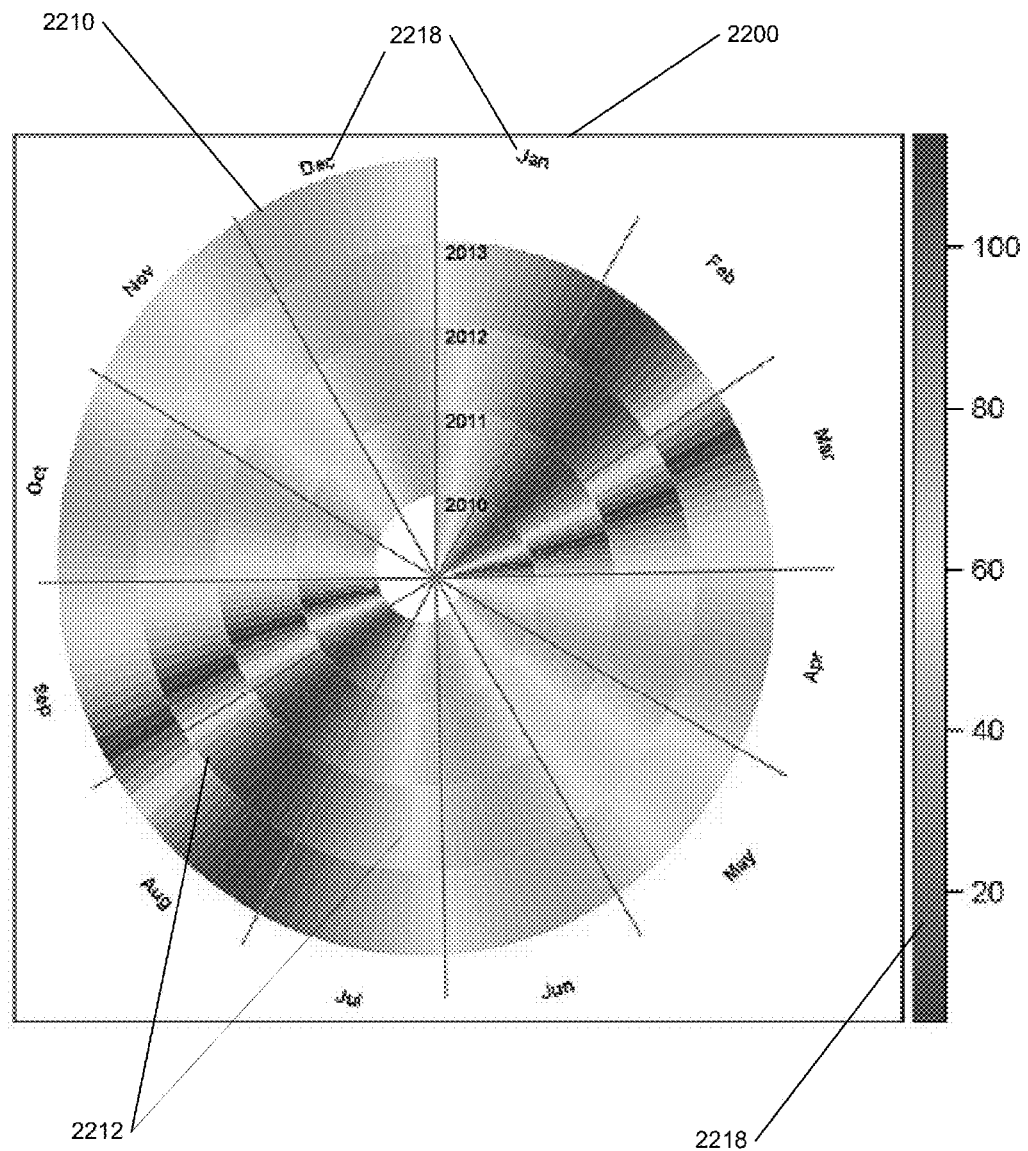
FIG. 22 illustrates an example of a display of the FIG. 1 computer processing system on which a graph is generated.

FIG. 22 illustrates a graph display 2200 that shows a variation on a heat map, and shows a type of graph referred to herein as a spiral heat map. The FIG. 22 display 2200 of the graphing computer system of FIG. 1 shows an example of a plurality of geometric shapes, arranged into a spiral form 2210. The geometric shapes comprise radially-arranged segments that resemble pie slices in a serial spiral placement. Each geometric shape includes a fill color that indicates magnitude of a variable of the dataset, such that the fill color may be a solid color, may be a color with a gradient or illustrating a spectrum of color, or may be a color indicated by striping or cross-hatching or the like. In the use case of FIG. 22, a spiral heat map is used to display monthly weather data values across a range of approximately zero (0) to one-hundred-twenty (120) degrees Fahrenheit in a spiral configuration, such that one revolution (i.e., one 360-degree traversal of the spiral) encompasses data for a 12-month period, as indicated by the month names 2216 (two of which are indicated, for simplicity of illustration) along the outer circumference of the spiral. The color of any one segment 2212 (two of which are indicated in the spiral heat map 2210) has a data value that is the value in the corresponding color in the vertical column 2218 at the right of the display. Viewing the data arranged in a spiral fashion facilitates a visual recognition of data trends and patterns over the course of a 12-month period, as compared to arranging the data value segments in a table or columnar fashion.

As noted above, the GTL of SAS may be used to provide program code that, when executed, will specify graph displays, such as FIG. 22. The GTL of SAS provides an implementation with a command line interface, and can also be implemented and accessed via a GUI presentation on a computer display of the graphing computer system. To generate the graph display of FIG. 22, in command line format, for example, the code for generating the graph display may be initiated with the non-limiting example of command line code such as listed in TABLE 6 below to produce the graph plot of FIG. 22:

TABLE 6

```
/*%let
gpath='\\sashq\root\dept\dvr\Patents\PolygonPlot_SAS_59744\Final\Image';*/
%let gpath='.';
%let dpi=200;
ods html close;
ods listing gpath=&gpath image_dpi=&dpi;
%let Height=1;
%let Step=2;
%let A=0.25;
%let Thickness=1;
%let Arrow=No;
/*--Simulate daily temperature data over 4 years--*/
data temp;
    format date date9.;
    retain min 10000 max 0 maxHigh 0;
    drop min max i;
    pi=constant("PI");
    do i='Jan. 1, 2010'd to 'Dec. 31, 2013'd by &step;
        date=i;
high=80*sin(pi*i/180)+40*sin(3*pi*i/180+pi/4)+20*cos(5*pi*i/180+pi/6)+10*cos(7*
pi*i/180+pi/6);
        group=1;
        if high < 0 then do;
            high=abs(high);
            group=2;
        end;
        low =high-10*ranuni(2);
        year=year(date);
        min=min(min, year);
        max=max(max, year);
        maxHigh=max(maxHigh, high);
        daysInYear=intck('DAY', mdy(1, 1, year), mdy(1, 1, year+1));
        theta=360*intck('DAY', mdy(1, 1, year), date) / daysinyear;
        output;
    end;
    call symput ("minYear", min);
    call symput ("maxYear", max);
    call symput ("maxHigh", maxHigh);
run;
/*proc print data=temp;run;*/
/*--Number of cycles in the data--*/
%let cycles=%sysevalf(&maxYear-&minYear+1);
/data _null_;*/
/* put &cycles;*/
/* run;*/
/*--Make Spiral curve for same duration--*/
data spiral_Curve;
    keep theta xs ys;
```

TABLE 6-continued

```
    b=1/(360*&cycles);
    pi=constant("PI");
    h=&Height/&Cycles;
    do theta=0 to &Cycles*360 by &step;
        r=&A+b*theta;
    xs=-r*cos((theta+90)*pi/180);
    ys=rsin((theta+90)*pi/180);
    output;
    end;
    %let axismax=%sysevalf(&A+1);
run;
/*proc print data=spiral_Curve;run;*/
/*--Transform data to Spiral--*/
data spiral_Data;
    set temp;
    keep thetad h high x y x2 y2 group id px py;
    format high 3.0;
    retain id 0;
    b=1/(360*&cycles);
    pi=constant("PI");
    h=&Height*high/(&Cycles*&maxHigh);
    h2=&Height /(&Cycles);
    del=&step/2;
    n=year-&minYear;
    thetad=360*(n + intck('DAY', mdy(1, 1, year), date) / daysInYear);
        r=&A+b*thetad;
    x=-r*cos((thetad+90)*pi/180);
    y=rsin((thetad+90)*pi/180);
    cx=-x/r; cy=-y/r;
    x2=x+h*cx; y2=y+h*cy;
    id=id+1;
    r=&A+b*(thetad-del);
        px=4*cos((thetad+90-del)*pi/180);
    py=rsin((thetad+90-del)*pi/180); output;
    r=&A+b*(thetad+del);
        px=-r*cos((thetad+90+del)*pi/180);
    py=r*sin((thetad+90+del)*pi/180); output;
    r=&A+b*(thetad+del);
    px=-(r-h2)*cos((thetad+90+del)*pi/180);
    py=(r-h2)*sin((thetad+90+del)*pi/180); output;
    r=&A+b*(thetad-del);
    px=-(r-h2)*cos((thetad+90-del)*pi/180);
    py=(r-h2)*sin((thetad+90-del)*pi/180); output;
run;
/*proc print data=spiral_Data;run;*/
data gridlines;
    keep xo yo xr yr xl yl month month2 theta angle year daysInYear xy yy;
    length month month2 $6;
    b=1/(360*&cycles);
    pi=constant("PI");
    r=&A+V&Cycles*360;
    rl=r;
    xo=0; yo=0;
    daysInYear=intck('DAY', mdy(1, 1, &minYear), mdy(1, 1, &minYear+1));
    /*--Radial grid lines at each month--*/
    do mth=1 to 12;
        theta=360* intck('DAY', mdy(1, 1, &minYear), mdy(mth, 1, &minYear)) / daysInYear;
        theta2=360* intck('DAY', mdy(1, 1, &minYear), mdy(mth, 15, &minYear)) / daysInYear;
    xr=-r*cos((theta+90)*pi/180);
    yr=r*sin((theta+90)*pi/180);
    xl=rl*cos((theta2+90)*pi/180);
    yl=rl*sin((theta2+90)*pi/180);
    month=''; month2='';
    select (mth);
        when (1) month='Jan';
        when (2) month='Feb';
        when (3) month='Mar';
        when (4) month='Apr';
        when (5) month2='May';
        when (6) month2='Jun';
        when (7) month2='Jul';
        when (8) month2='Aug';
        when (9) month2='Sep';
        when (10) month='Oct';
        when (11) month='Nov';
        when (12) month='Dec';
        otherwise;
    end;
```

TABLE 6-continued

```
    if mth > 3 and mth < 10 then angle=-theta2-180;
        else angle=-theta2;
    output;
    end;
    call missing(month, month2, xr, yr, xl, yl, theta);
    do year=&minYear to &maxYear by 1;
        r=&A+b*(year-&minYear)*360;
    xy=-r*cos((0+90)*pi/180);
    yy=rsin((0+90)*pi/180);
    output;
    end;
run;
/*proc print data=gridlines;run;*/
/*--Combine curve with data--*/
data spiral_combined;
merge spiral_curve spiral_Data gridlines;
run;
/*proc print data=spiral_combined;run;*/
/*--Make Spiral graph--*/
ods graphics / reset attrpriority=color width=4.5in height=4in
imagename='Spiral_HeatMap_Grid_2';
proc sgplot data=spiral_combined;
/* series x=xs y=ys / smoothconnect lineattrs=(thickness=&thickness);*/
    polygon x=px y=py id=id / colorresponse=high fill colormodel=(green yellow
red);
    vector x=xr y=yr / xorigin=xo yorigin=yo lineattrs=(color=gray) noarrowheads;
    text x=xl y=yl text=month / rotate=angle position=top textattrs=(size=6
weight=bold);
    text x=xl y=yl text=month2 / rotate=angle position=bottom textattrs=(size=6
weight=bold);
    text x=xy y=yy text=year / position=bottomright textattrs=(size=6 weight=bold);
    xaxis min=-&axismax max=&axismax display=none;
    yaxis min=-&axismax max=&axismax display=none;
    gradlegend / title='';
    run;
```

In the TABLE 6 code above, after an initial section in which display and data parameters are provided, it can be seen that a "data temp" section specifies data for plotting, and a "data spiral_Curve" section and "data spiral_Data" section specify data for constructing the display shapes of the graph display. A data section called "data gridlines" specifies the spiral radial arrangement of the pie-shaped segments. A data section called "data spiral_combined" initiates merging shapes and spiral arrangement of the display. The last section of TABLE 6 code initiates the rendering of the graph display, in the "ods graphics" section of code. The "ods graphics" code section includes a "proc sgplot" statement that specifies the display layout of shapes and text. It should be noted that code with a "fill" value indicated for a shape may be specified to a zero (i.e., transparent) value, for those shapes that are not intended to be filled, for purposes of the display. Those skilled in the art will appreciate that some of the lines of code in TABLE 6, such as format specifications, process calls, and calls to an output display system (ods) and the like, are unique to the operating environment of the SAS system referred to above. Those skilled in the art will understand corresponding code that would be utilized in other graphing systems.

Centered Pie Chart

Another useful data visualization technique possible with the description herein is the "Centered Pie Chart". A pie chart is a very useful visual when making "part to whole" comparisons, and especially useful with two slices. This is illustrated in FIG. 9.

Figure 9:
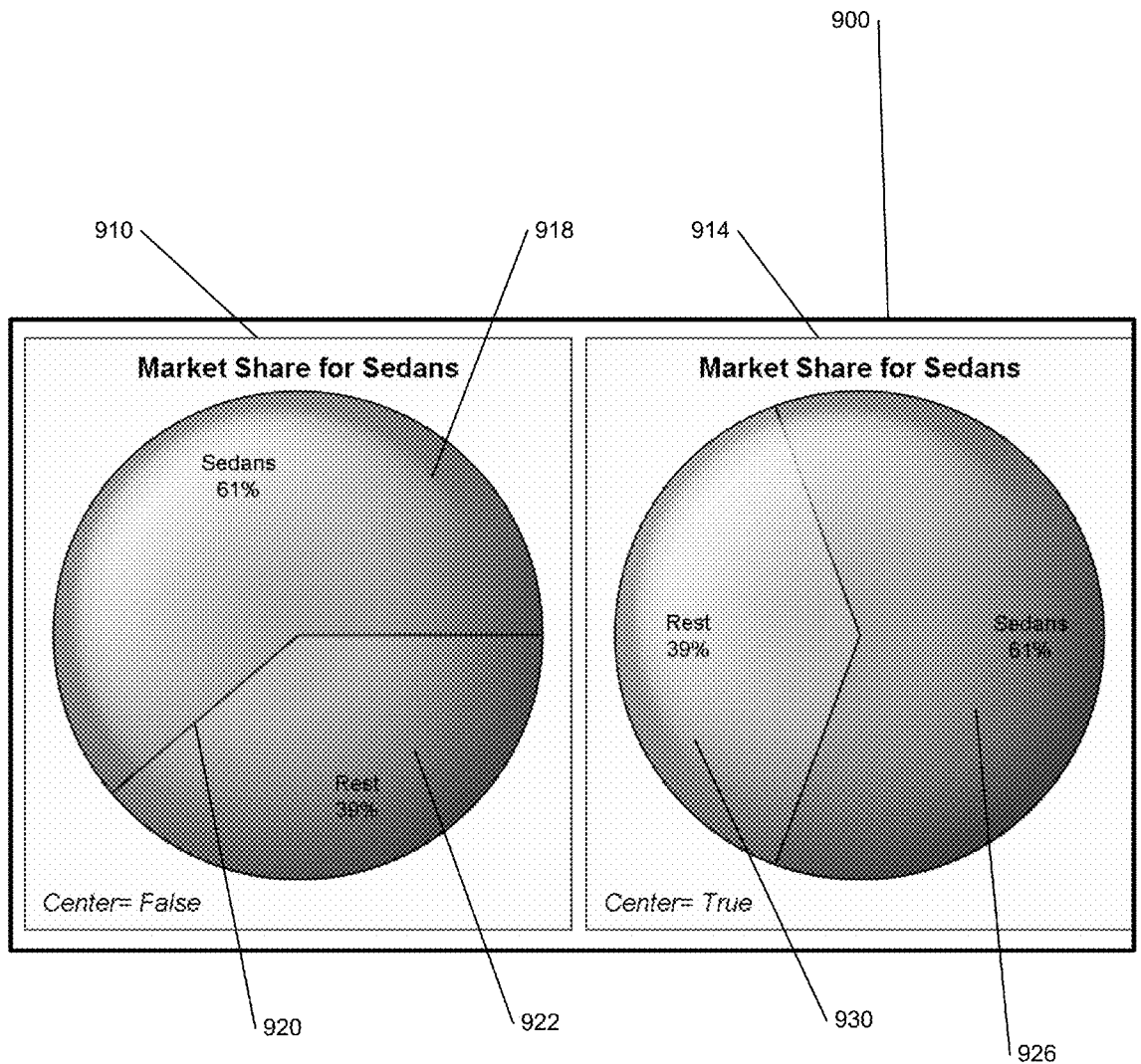
FIG. 9 illustrates an example of a display of the FIG. 1 computer processing system on which a graph is generated.

FIG. 9 illustrates two examples of a display 900 of the FIG. 1 computer processing system that shows an example of a geometric shape of the display comprising circles. More particularly, in the FIG. 9 example, a first pie chart 910 is illustrated on the left side of FIG. 9, and a variation on the first pie chart 914, in accordance with the system described herein, is presented on the right side of FIG. 9. Each pie chart graph 910, 914 may comprise a graph shown on a respective separate display rendering of the system.

The pie chart 910 illustrated on the left of FIG. 9 shows a pie slice start angle of 0 (zero) degrees 912. That is, the pie slices 918, 922 are drawn starting from a horizontal orientation parallel to the X-axis of the graph, on the right (that is, at the 3 O'clock position), wherein the first slice 918 starts at zero degrees 912 and extends counterclockwise around the pie to the first slice end line 920. The second slice 922 begins at the end line 920 of the first slice 918 and continues to the start location 912 at zero degrees. The pie 914 on the right also starts the slices from the top except, the slices are "centered" on the starting point. That is, the chart portions are symmetric about a "start" line that is oriented at one of the "clock" positions of 12:00, 3:00, 6:00, or 9:00. This configuration results in a pie chart that is symmetric around the horizontal axis. The pie chart 914 that is generated in accordance with the disclosure herein is more easily specified and is more easily understood. More particularly, for a traditional pie chart such as the left graph 910, the angle at which the first slice 918 is drawn is specified, and the extent of the first slice is indicated by the ending slice angle 920. In the SAS pie chart of the right graph 914, the angle about which the first slice 926 will be drawn symmetrically is indicated, which in the FIG. 9 illustration is at zero degrees, an angle specified relative to the X-axis. For the SAS pie chart 914, subsequent slices also will be symmetric about the same specified start angle (zero degrees). Thus, all the slices in the graph 914 will be aligned with the same start angle. It should be apparent from the FIG. 9 illustration that all the slices 926, 930 are symmetric about the same angle (i.e., the start angle of zero degrees).

Thus, the pie chart 910 on the left of FIG. 9 has two pie chart portions 918, 922 that represent relative data values, but the two portions are not optimally arranged for the viewer. The pie chart 914 on the right, however, is generated in accordance with the disclosure herein, and has two pie chart portions 926, 930 that represent data values, and the two portions 926, 930 are better arranged and easier to view and comprehend as compared to the left pie chart 910, in part because they are arranged symmetrically relative to the X-axis.

Figure 10:
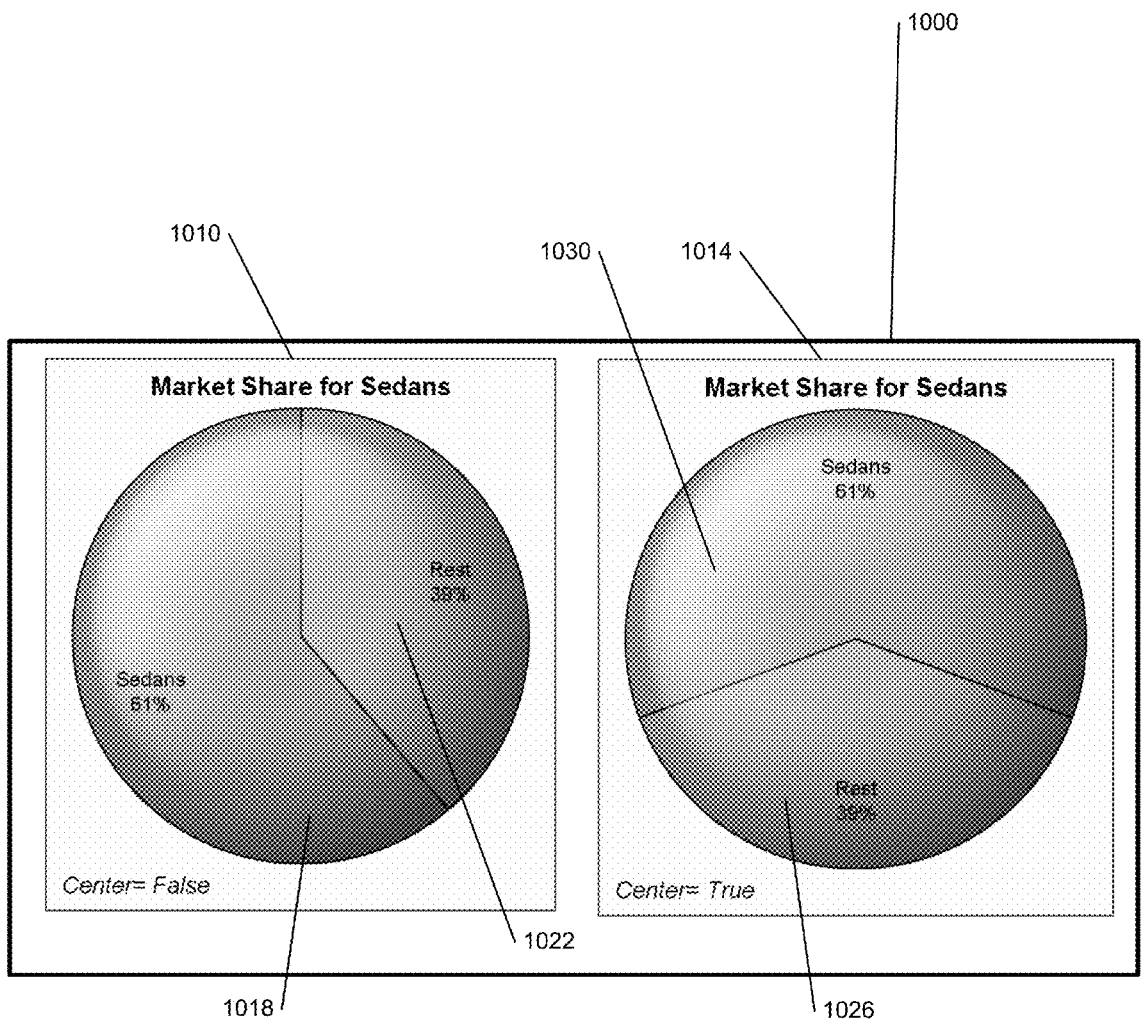
FIG. 10 illustrates an example of a display of the FIG. 1 computer processing system on which a graph is generated.

FIG. 10 shows representations similar to FIG. 9, except that the "start angle" of the chart portions in the left chart 1010 is oriented vertically, an angle that is perpendicular to the X-axis 1012 and that corresponds to ninety degrees. That is, the first slice 1018 is drawn starting from a vertical orientation perpendicular to the X-axis of the graph, at the 12 O'clock position, such that the first slice 1018 starts at ninety degrees 1012 and extends counterclockwise around the pie to the first slice end line 1020. The second slice 1022 begins at the end line 1020 of the first slice 1018 and continues to the start location 1012 at ninety degrees. The pie chart portions in the right chart 1014 are rotated 90 degrees counterclockwise as compared to the right slices 914 of FIG. 9. In the FIG. 10 display of the left chart 1010, the portions start at a slice angle at the top (12 O'clock position) of the graph, and are drawn serially, counterclockwise around the pie. In contrast, the chart 1014 on the right of FIG. 10 uses the "Center first slice" option as disclosed herein, and therefore the angle about which the first slice 1026 will be drawn symmetrically is indicated in the data, which in the FIG. 10 illustration is at ninety degrees, an angle specified relative to the X-axis at zero degrees. For the SAS pie chart 1014, subsequent slices also will be symmetric about the same specified start angle (ninety degrees) for the first slice 1026. Thus, all the slices in the graph 1014 will be aligned with the same start angle of ninety degrees. It should be apparent from the FIG. 10 illustration that all the slices 1026, 1030 are symmetric about the same angle (i.e., the start angle of ninety degrees).

As before, the pie chart 1010 on the left has two pie chart portions 1018, 1022 that represent relative data values, but the two portions are not especially easy or aesthetically pleasing to view. The pie chart 1014 on the right has two pie chart portions 1026, 1030 that represent relative data values, and the two portions are better arranged and easier to view and comprehend, in part because they are arranged symmetrically relative to the X-axis In both FIG. 9 and FIG. 10, the pie chart on the right that uses the "Center first Slice" configuration creates a symmetric pie chart that is much easier to understand visually. It is relatively easy to estimate the portion of the pie chart represented in each slice in the pie chart on the right. The "Centered" pie charts are more satisfactory to the human psyche.

Figure 11:
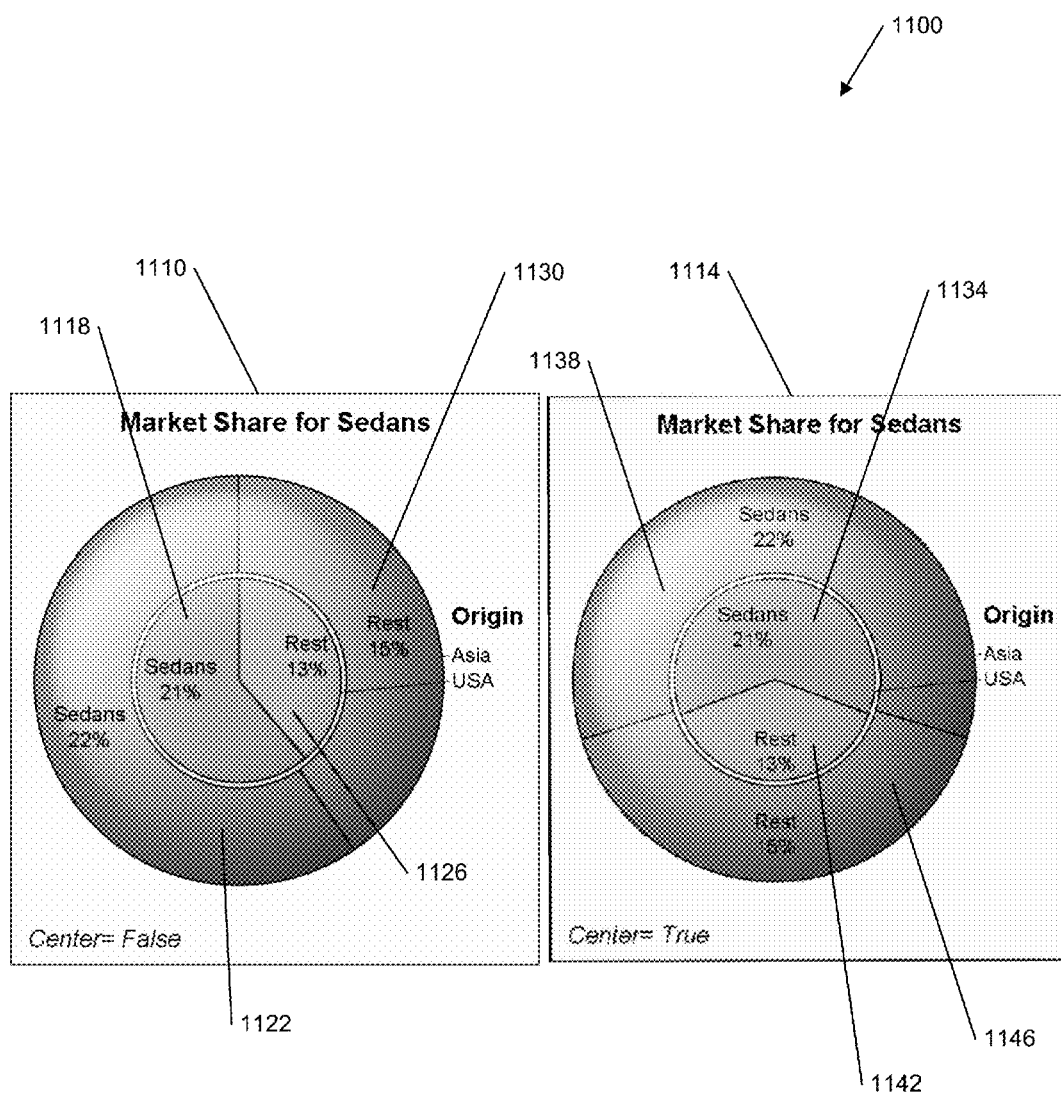
FIG. 11 illustrates an example of a display of the FIG. 1 computer processing system on which a graph is generated.

FIG. 11 shows grouped pie charts, and shows that the same viewing principles hold true when a grouped pie chart is visualized. The pie chart 1110 on the left does not center the slices, whereas the pie chart 1114 on the right does. The pie chart 1114 on the right is symmetric and simple, and easier to consume and understand. The left chart includes central portions 1118, 1126 and outer portions 1122, 1130. The pie chart 1114 on the right is symmetric and simple, and easier to consume and understand. The left chart 1110 includes central portions 1118, 1126 and outer portions 1122, 1130. The right chart 1114 includes central portions 1134, 1142 and outer portions 1138, 1146.

The displays of FIGS. 9, 10, and 11 all provide variations on pie charts, and may be initiated with the non-limiting example of command line code such as listed in TABLE 7 below:

TABLE 7

```
%let gpath='.';
%let dpi=200;
ods html close;
ods listing gpath=&gpath image_dpi=&dpi;
title;
footnote;
ods html close;
ods listing style=analysis gpath=&gpath image_dpi=&dpi;
/*--Macro by Perry Watts--*/
%macro RGBHex(rr,gg,bb);
    %sysfunc(compress(CX%sysfunc(putn(&mhex2.))
    %sysfunc(putn(&gg,hex2.))
    %sysfunc(putn(&bb,hex2.))))
%mend RGBHex;
proc sort data=sashelp.cars out=CarsByOrigin;
    by origin;
    run;
data GTL_Sedans;
    retain Sedans 0 Rest 0;
    format Count percent5.0;
    keep Origin Type Count;
    set CarsByOrigin nobs=totalcount;
    by origin;
    if first.origin then do; Sedans=0; Rest=0; end;
    if type eq 'Sedan' then Sedans+1;
    else Rest+1;
    if last.origin then do;
        Type='Sedans'; Count=Sedans/totalcount; output;
            Type='Rest'; Count=Rest/totalcount; output;
        end;
    run;
/*--Pie Define template--*/
proc template;
    define statgraph PieChart_PPT;
    dynamic _group _center _start;
```

TABLE 7-continued

```
begingraph;
    entrytitle "Market Share for Sedans";
        entryfootnote halign=left 'Center=' _center;
    layout region;
        piechart category=type response=count / group=_group groupgap=5
            dataskin=sheen centerfirstslice=_center start=start;
        endlayout;
    endgraph;
end;
run;
/--Pie No Center Start=0--*/
ods listing style=analysis;
ods graphics / reset width=3in height=3.25in
imagename='FIG._9A_Pie_O_NoCenter';
proc sgrender data=GTL_Sedans template=PieChart_PPT;
    dynamic _center='False' _start=0;
run;
/*--Pie Center Start=0--*/
ods listing style=analysis;
ods graphics / reset width=3in height=3.25in
imagename='FIG._9B_Pie_0_Center';
proc sgrender data=GTL_Sedans template=PieChart_PPT;
    dynamic _center='True' _start=0;
run;
/*--Pie No Center Start=90--*/
ods listing style=analysis;
ods graphics / reset width=3in height=3.25in
imagename='FIG._10A_Pie_90_NoCenter';
proc sgrender data=GTL_Sedans template=PieChart_PPT;
    dynamic _center='False' _start=90;
run;
/*--Pie Center Start=90--*/
ods listing style=analysis;
ods graphics / reset width=3in height=3.25in
imagename='FIG._10B_Pie_90_Center';
proc sgrender data=GTL_Sedans template=PieChart_PPT;
    dynamic _center='True' _start=90;
run;
/*--Group Pie No Center--*/
ods listing style=analysis;
ods graphics / reset width=3in height=3.25in
imagename='FIG._11A_PieGroup_NoCenter';
proc sgrender data=GTL_Sedans(where=(origin ne 'Europe'))
template=PieChart_PPT;
    dynamic _center='False' _group='origin' _start=90;
run;
/*--Group Pie Center--*/
ods listing style=analysis;
ods graphics / reset width=3in height=3.25in
imagename='FIG._11B_PieGroup_Center';
proc sgrender data=GTL_Sedans(where=(origin ne 'Europe'))
template=PieChart_PPT;
    dynamic _center='True' _group='origin' _start=90;
run;
```

In the TABLE 7 code above, after an initial section in which display and data parameters are provided, it can be seen that data for the graph display is provided in a "GTL_Sedans" data section. Another section of the TABLE 7 code comprises a specification of the graph layout, in the "proc template" section of code. The last section of TABLE 7 code initiates the rendering of the graph displays, in the "ods graphics" sections of code. Those skilled in the art will appreciate that some of the lines of code in TABLE 7, such as format specifications, process calls, and calls to an output display system (ods) and the like, are unique to the operating environment of the SAS system referred to above. Those skilled in the art will understand corresponding code that would be utilized in other graphing systems.

Hygrometer Plot

It is known to provide what is referred to as a "percent of frequency" graph, where the sum of all category values in a group are normalized and displayed as a stack adding up to 100%. Only frequency or percent data can be displayed in this type of graph.

Figure 12:
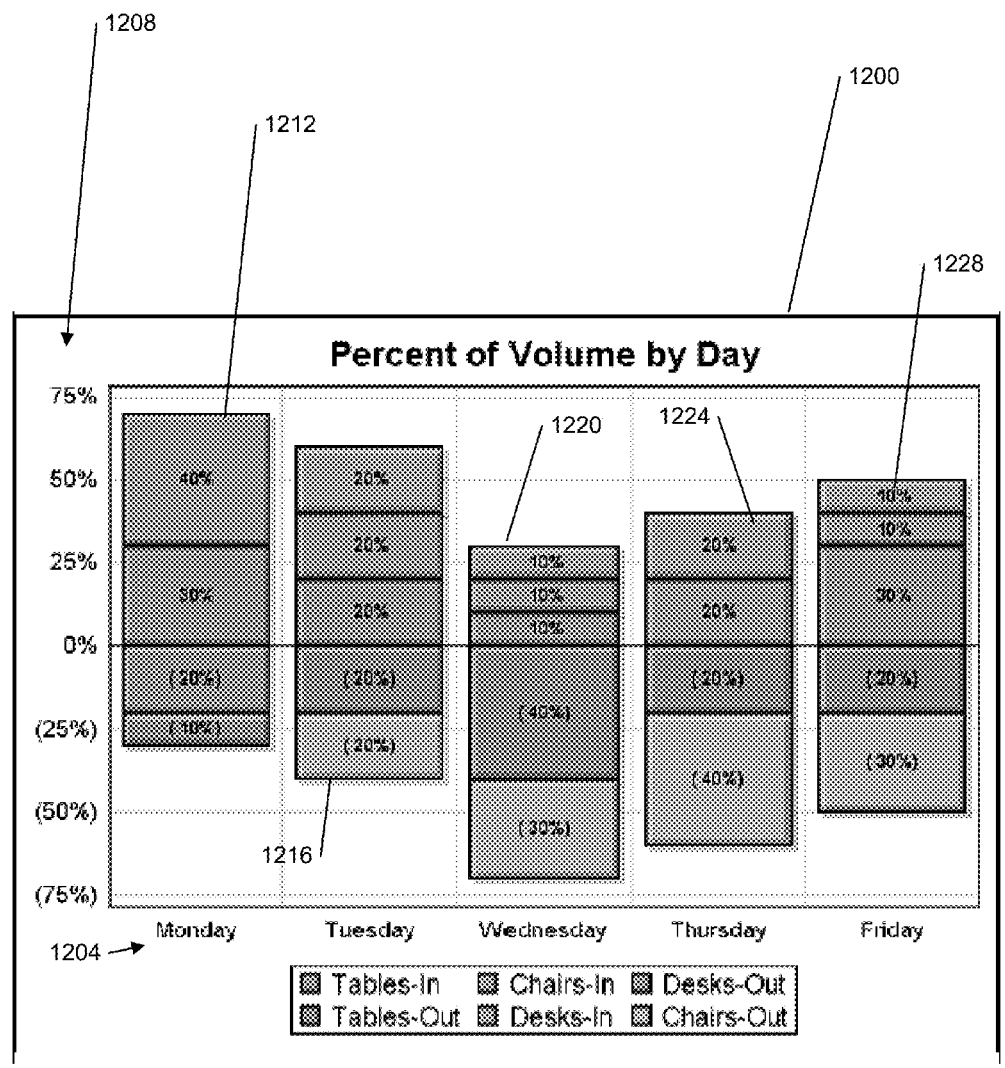
FIG. 12 illustrates an example of a display of the FIG. 1 computer processing system on which a graph is generated.

FIG. 12 illustrates a display 1200 of the computer system that shows a variation on the "percent of frequency" graph, in accordance with the description herein. The FIG. 12 graph may be characterized as a "Percent of Response Sum" graph, also referred to as a hygrometer plot. Two groups of category values are shown, one category 1204 adjacent the X-axis and another category 1208 adjacent the Y-axis. In each category of the X-axis values, response data values are grouped into stacks 1212, 1216, 1220, 1224, 1228.

In the hygrometer plot display 1200, response values of all groups in a category are normalized and then stacked as one bar so the total height of each bar is 100%. This type of plot supports both positive and negative data. Positive values are stacked above a zero line of the plot, and negative values are stacked below the zero line. The individual combination of positive and negative response values makes each bar "float" at different heights of the graph. Hence, the name "Hygrometer Plot" is used for this type of plot.

The floating position of each individual bar indicates the net volume for each bar. In this example, the vertical position of the bar (whether above or below the zero line) indicates the nature of the volume for that day, whether incoming or outgoing. The proportion of each segment within the bar shows which products have higher or lower contributions to the volume. The label in each segment shows the % amount. The legend below the plot identifies the type of traffic. For example, in FIG. 12, at the first bar 1212, the bar is composed of portions indicated as 40%, 30%, (20%), and (10%). These portions show that, for the volume (number) of items on that day, 40% of items for that day were incoming chairs (Chairs—In, as indicated in the legend 1234.) The bar 1212 also shows that, for that day, 30% of the items were incoming tables (Tables—In), 20% of the items for that day were outgoing desks (Desks—Out), and 10% of the items for that day were outgoing tables (Tables—Out). In the second bar 1216, the portions that make up the volume for the day are all equal-sized (i.e., 20%). The bar portions 1216 illustrated indicate that 20% of the volume for the day was comprised of Desks—In, 20% was Chairs—In, and 20% was Tables—In. Because these portions are all incoming, that is, a gain, these portions are shown above the 0% line. Other bar portions 1216 for that day indicate 20% Tables—Out and 20% Chairs—Out. Because these portions are all outgoing, that is, a loss, these portions are shown below the 0% line.

As noted above, the GTL of SAS may be used to provide program code that, when executed, will specify graph displays, such as FIG. 12. The GTL of SAS provides an implementation with a command line interface, and can also be implemented and accessed via a GUI presentation on a computer display of the graphing computer system. To generate the graph display of FIG. 12, in command line format, for example, the code for generating the graph display may be initiated with the non-limiting example of command line code such as listed in TABLE 8 below to produce the graph plot of FIG. 12:

TABLE 8

```
%let gpath='.';
%let dpi=200;
ods html close;
ods listing image_dpi=&dpi gpath=&gpath;
proc format;
    value G100Day
        1='Monday'
        2='Tuesday'
        3='Wednesday'
        4='Thursday'
        5='Friday';
run;
data G100;
    input Product $1-10 Day Count Label;
    format Count Label percent. Day G100Day.;
    datalines;
Tables-In 1 0.3 0.15
Chairs-In 1 0.4 0.50
Desks-Out 1 -0.2 -0.1
Tables-Out 1 -0.1 -0.25
Tables-In 2 0.2 0.1
Chairs-In 2 0.2 0.3
Desks-In 2 0.2 0.5
Tables-Out 2 -0.2 -0.1
Chairs-Out 2 -0.2 -0.3
Tables-In 3 0.1 0.05
Chairs-In 3 0.1 0.15
Desks-In 3 0.1 0.25
Tables-Out 3 -0.4 -0.2
Chairs-Out 3 -0.3 -0.55
Chairs-In 4 0.2 0.1
Desks-In 4 0.2 0.3
Tables-Out 4 -0.2 -0.1
Chairs-Out 4 -0.4 -0.4
Tables-In 5 0.3 0.15
Chairs-In 5 0.1 0.35
Desks-In 5 0.1 0.45
Tables-Out 5 -0.2 -0.1
Chairs-Out 5 -0.3 -0.35
;
run;
proc template;
    define statgraph G100;
        begingraph;
            entrytitle 'Percent of Volume by Day';
            layout overlay / xaxisopts=(type=discrete display=( tickvalues) griddisplay=on
                    offsetmin=0.1 offsetmax=0.1 tickvalueattrs=(size=7)
                    discreteopts=(ticktype=inbetween))
                yaxisopts=(display=( tickvalues) griddisplay=on
        tickvalueattrs=(size=7));
                barchart category=day response=count / group=product
        outlineattrs=(color=black)
                    dataskin=crisp name='a' group100=magnitude;
                scatterplot x=day y=label / markercharacter=count
        markercharacterattrs=(size=6 weight=bold);
                discretelegend 'a';
            endlayout;
```

TABLE 8-continued

```
    endgraph;
  end;
run;
ods listing style=listing;
ods graphics / reset attrpriority=color width=4in height=3in
imagename='FIG._12_G100Net';
proc sgrender data=G100 template=G100;
run;
```

In the TABLE 8 code above, after an initial section in which display and data parameters are provided, it can be seen that data for the graph display is provided in several data sections, noted as a "data G100" and a "data G100_Net" section. Another section of the TABLE 8 code comprises a specification of the graph layout, in the "proc template" section of code. The last section of TABLE 8 code initiates the rendering of the graph display, in the "ods graphics" section of code. Those skilled in the art will appreciate that some of the lines of code in TABLE 8, such as format specifications, process calls, and calls to an output display system (ods) and the like, are unique to the operating environment of the SAS system referred to above. Those skilled in the art will understand corresponding code that would be utilized in other graphing systems.

Figure 13:
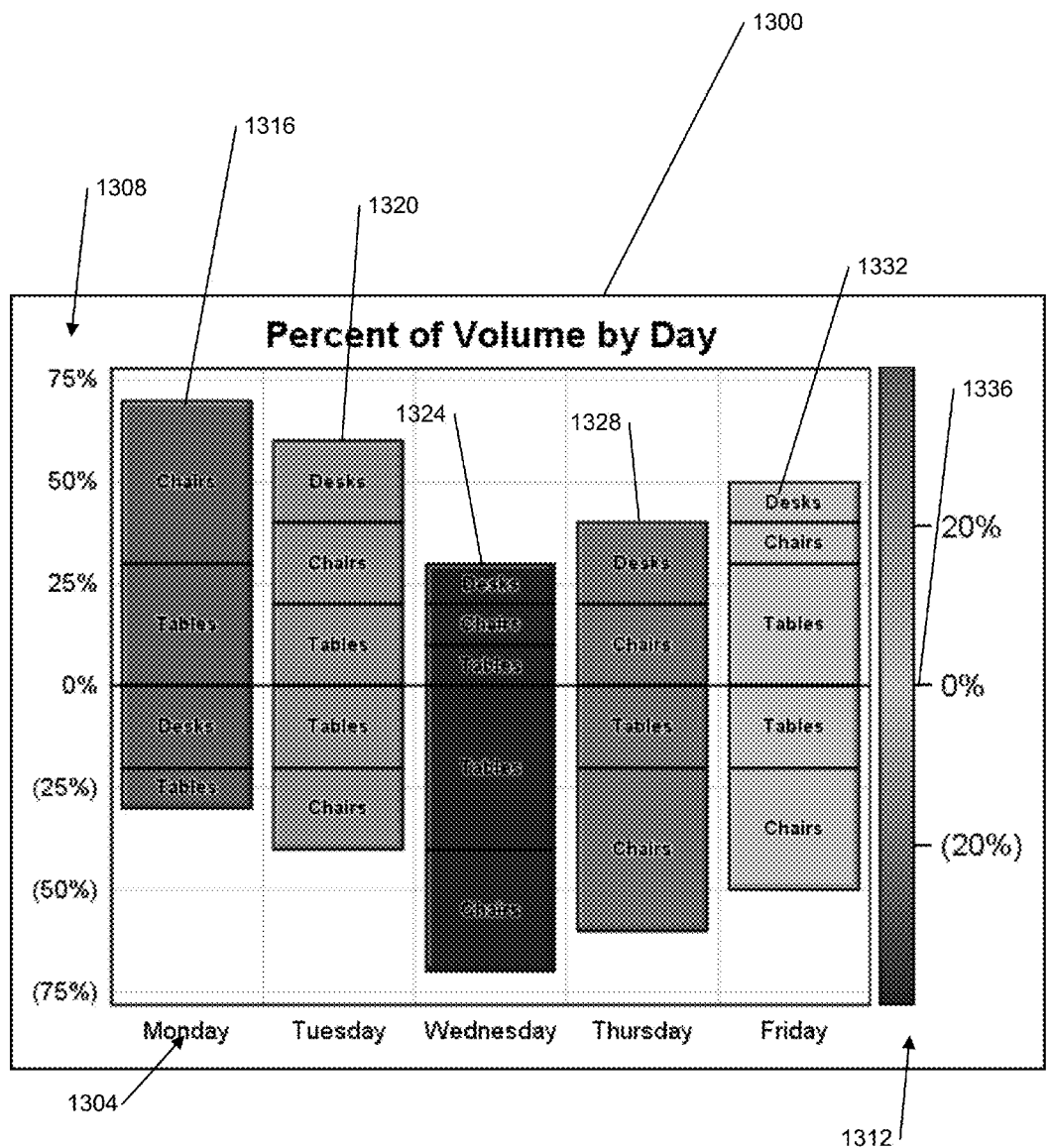
FIG. 13 illustrates an example of a display of the FIG. 1 computer processing system on which a graph is generated.

FIG. 13 shows a hygrometer plot display 1300 having X-axis category values 1304 and Y-axis category values 1308. The Y-category values 1308 relate to the percent of volume for each day, which is the index 1304 along the X-axis. The response data is arranged into groups of bar plots 1316, 1320, 1324, 1328, 1332 of chairs, tables and desks, and are configured according to days of the week. Each individual group bar 1316, 1320, 1324, 1328, 1332 can be coded with respect to a vertical data value bar 1312 that extends from an indicated value greater than 20% positive, across a zero line 1336 to an indicated value less than 20% negative. That is, each group bar may be coded to its largest volume percentage in accordance with the vertical data value bar 1312. For example, more than 60% of the Monday bar 1316 is above the zero line, and therefore it is coded in accordance with the vertical data value bar to reflect greater than an indicated 20%. More than 60% of the Wednesday bar 1324 is below the zero line, and therefore it is coded in accordance with the vertical data value bar to reflect less than an indicated 20% negative.

The FIG. 13 type of plot could be useful, for example, to track arrivals and departures at Airports, or Stock transaction volume initiated as a sale or a buy. In FIG. 13, the segment label represents the type of product, such as chairs, tables, desks, and tables. In the case of airport traffic or stock transactions, the segment labels would correspond to different entities, such as airlines or corporation names.

As noted above, the GTL of SAS may be used to provide program code that, when executed, will specify graph displays, such as FIG. 13. The GTL of SAS provides an implementation with a command line interface, and can also be implemented and accessed via a GUI presentation on a computer display of the graphing computer system. To generate the graph display of FIG. 13, in command line format, for example, the code for generating the graph display may be initiated with the non-limiting example of command line code such as listed in TABLE 9 below to produce the graph plot of FIG. 13:

TABLE 9

```
%let gpath='.';
%let dpi=200;
ods html close;
ods listing image_dpi=&dpi gpath=&gpath;
proc format;
    value G100Day
        1='Monday'
        2='Tuesday'
        3='Wednesday'
        4='Thursday'
        5='Friday';
run;
data G100;
    input Product $1-10 Day Count Label;
    format Count Label percent. Day G100Day.;
    datalines;
Tables-In 1 0.3 0.15
Chairs-In 1 0.4 0.50
Desks-Out 1 −0.2 −0.1
Tables-Out 1 −0.1 −0.25
Tables-In 2 0.2 0.1
Chairs-In 2 0.2 0.3
Desks-In 2 0.2 0.5
Tables-Out 2 −0.2 −0.1
Chairs-Out 2 −0.2 −0.3
Tables-In 3 0.1 0.05
Chairs-In 3 0.1 0.15
Desks-In 3 0.1 0.25
Tables-Out 3 −0.4 −0.2
Chairs-Out 3 −0.3 −0.55
Chairs-In 4 0.2 0.1
Desks-In 4 0.2 0.3
```

TABLE 9-continued

```
Tables-Out 4 −0.2 −0.1
Chairs-Out 4 −0.4 −0.4
Tables-In 5 0.3 0.15
Chairs-In 5 0.1 0.35
Desks-In 5 0.1 0.45
Tables-Out 5 −0.2 −0.1
Chairs-Out 5 −0.3 −0.35
;
run;
/*--Compute Net Volume column--*/
data G100_Net;
   keep Product Prod Day Count Label Net macroname;
   retain value;
   set G100;
   by day;
   len=find(product, '-');
   Prod=substr(product, 1, len-1);
   if first.day then do; value=count; net=.; end;
   else do; value+count; end;
   if last.day then net=value;
   macroname="Net" || put(day, 1.0);
   call symput(macroname, net);
   run;
data rect;
   keep Color XR XROff YR;
   format XR G100Day. YR color percent.;
   set G100_net;
   by day;
   if last.day then do;
      call missing (color);
      XR=day; XRoff=−0.5; YR=0; output;
      XR=day; XRoff=−0.5; YR=−1.0; output;
      XR=day; XRoff=0.5; YR=−1.0; output;
      XR=day; XRoff=0.5; YR=0; output;
   end;
   run;
data Merged;
   merge G100_Net rect;
   run;
data mergedColor;
   set merged;
   color=symget(macroname); output;
run;
proc template;
   define statgraph G100GradientTextWater;
      dynamic _lblcolor;
      begingraph;
         entrytitle 'Percent of Volume by Day';
         layout overlay / xaxisopts=(type=discrete display=( tickvalues) griddisplay=on
                  offsetmin=0.1 offsetmax=0.1 tickvalueattrs=(size=7)
                  discreteopts=(ticktype=inbetween tickvaluefitpolicy=none))
               yaxisopts=(display=( tickvalues) griddisplay=on
tickvalueattrs=(size=7)
                  linearopts=(viewmin=−0.8 viewmax=0.8
                     tickvaluesequence=(start=−0.8 end=0.8
increment=0.2)));
            barchart category=day response=count / group=product
colorresponse=color name='a'
               outlineattrs=graphoutlines group100=magnitude
               colormodel=(maroon silver forestgreen) dataskin=crisp;
            textplot x=day y=label text=Prod / textattrs=(color=_lblcolor size=6
weight=bold)
               backlight=0.5;
            continuouslegend 'a';
         endlayout;
      endgraph;
   end;
run;
ods graphics / reset attrpriority=color width=4in height=3in
imagename='FIG._13_G100GradientBlack';
proc sgrender data=mergedColor template=G100GradientTextWater;
   dynamic _lblcolor='Black';
run;
```

In the TABLE 9 code above, after an initial section in which display and data parameters are provided, it can be seen that data for the graph display is provided in several data sections, noted as a "data G100", a "data poly", and a "data Merged" section. Another section of the TABLE 9 code comprises a specification of the graph layout, in the "proc template" section of code. The last section of TABLE 9 code initiates the rendering of the graph display, in the "ods graphics" section of code. Those skilled in the art will appreciate that some of the lines of code in TABLE 9, such as format specifications, process calls, and calls to an output display system (ods) and the like, are unique to the operating environment of the SAS system referred to above. Those skilled in the art will understand corresponding code that would be utilized in other graphing systems.

Figure 14:
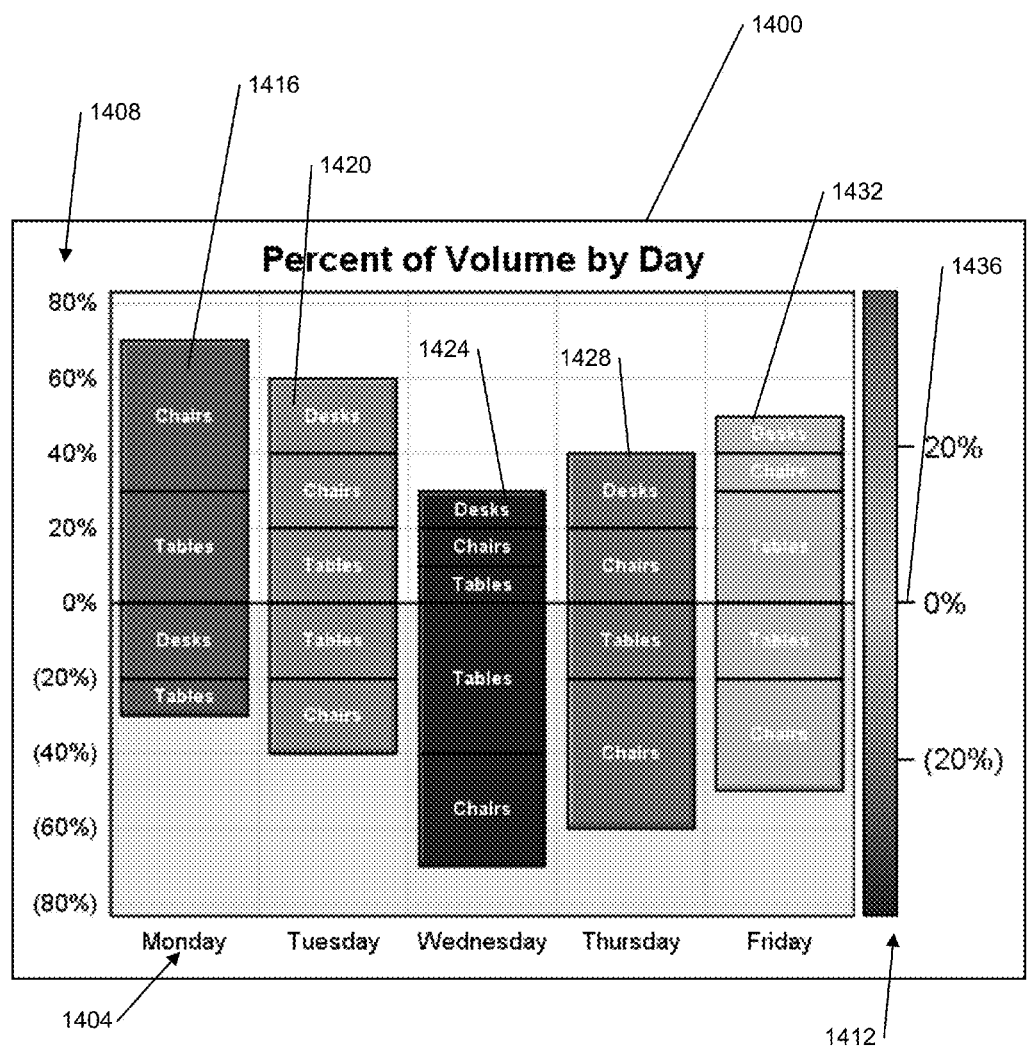
FIG. 14 illustrates an example of a display of the FIG. 1 computer processing system on which a graph is generated.

FIG. 14 shows a display of the computer system that is an alternative representation of the information shown in FIG. 13, except that in FIG. 14 the graph area below the zero line 1436 is shaded to give emphasis to the negative region 1440. This shading is easily created using the PolygonPlot statement noted above.

As noted above, the GTL of SAS may be used to provide program code that, when executed, will specify graph displays, such as FIG. 14. The GTL of SAS provides an implementation with a command line interface, and can also be implemented and accessed via a GUI presentation on a computer display of the graphing computer system. To generate the graph display of FIG. 14, in command line format, for example, the code for generating the graph display may be initiated with the non-limiting example of command line code such as listed in TABLE 10 below to produce the graph plot of FIG. 14:

TABLE 10

```
%let gpath='.';
%let dpi=200;
ods html close;
ods listing image_dpi=&dpi gpath=&gpath;
proc format;
   value G100Day
       1='Monday'
         2='Tuesday'
         3='Wednesday'
         4='Thursday'
         5='Friday';
run;
data G100;
   input Product $1-10 Day Count Label;
   format Count Label percent. Day G100Day.;
   datalines;
Tables-In 1 0.3 0.15
Chairs-In 1 0.4 0.50
Desks-Out 1 −0.2 −0.1
Tables-Out 1 −0.1 −0.25
Tables-In 2 0.2 0.1
Chairs-In 2 0.2 0.3
Desks-In 2 0.2 0.5
Tables-Out 2 −0.2 −0.1
Chairs-Out 2 −0.2 −0.3
Tables-In 3 0.1 0.05
Chairs-In 3 0.1 0.15
Desks-In 3 0.1 0.25
Tables-Out 3 −0.4 −0.2
Chairs-Out 3 −0.3 −0.55
Chairs-In 4 0.2 0.1
Desks-In 4 0.2 0.3
Tables-Out 4 −0.2 −0.1
Chairs-Out 4 −0.4 −0.4
Tables-In 5 0.3 0.15
Chairs-In 5 0.1 0.35
Desks-In 5 0.1 0.45
Tables-Out 5 −0.2 −0.1
Chairs-Out 5 −0.3 −0.35
;
run;
/*--Compute Net Volume column--*/
data G100_Net;
   keep Product Prod Day Count Label Net macroname;
   retain value;
   set G100;
   by day;
   len=find(product, '-');
   Prod=substr(product, 1, len-1);
   if first.day then do; value=count; net=.; end;
   else do; value+count; end;
   if last.day then net=value;
   macroname="Net" || put(day, 1.0);
   call symput(macroname, net);
   run;
data rect;
   keep Color XR XROff YR;
   format XR G100Day. YR color percent.;
   set G100 net;
   by day;
   if last.day then do;
      call missing (color);
      XR=day; XRoff=−0.5; YR=0; output;
```

TABLE 10-continued

```
      XR=day; XRoff=-0.5; YR=-1.0; output;
      XR=day; XRoff=0.5; YR=-1.0; output;
      XR=day; XRoff=0.5; YR=0; output;
    end;
    run;
data Merged;
    merge G100_Net rect;
    run;
data mergedColor;
    set merged;
    color=symget(macroname); output;
run;
proc template;
    define statgraph G100GradientTextWater;
        dynamic _lblcolor;
        begingraph;
            entrytitle 'Percent of Volume by Day';
            layout overlay / xaxisopts=(type=discrete display=( tickvalues) griddisplay=on
                    offsetmin=0.1 offsetmax=0.1 tickvalueattrs=(size=7)
                    discreteopts=(ticktype=inbetween tickvaluefitpolicy=none))
                    yaxisopts=(display=( tickvalues) griddisplay=on
tickvalueattrs=(size=7)
                    linearopts=(viewmin=-0.8 viewmax=0.8
                        tickvaluesequence=(start=-0.8 end=0.8
increment=0.2)));
            polygonplot id=xr x=xr y=yr / xoffset=xroff display=(fill)
                    fillattrs=(color=lightblue transparency=0.5);
            barchart category=day response=count / group=product
colorresponse=color name='a'
                    outlineattrs=graphoutlines group100=magnitude
                    colormodel=(maroon silver forestgreen) dataskin=crisp;
            scatterplot x=day y=label / markercharacter=Prod
markercharacterattrs=(color=_lblcolor size=6 weight=bold);
            continuouslegend 'a';
        endlayout;
    endgraph;
    end;
run;
ods graphics / reset attrpriority=color width=4in height=3in
imagename='FIG._14_G100GradientWhiteWater';
proc sgrender data=mergedColor template=G100GradientTextWater;
    dynamic _lblcolor='White';
run;
```

In the TABLE 10 code above, after an initial section in which display and data parameters are provided, it can be seen that data for the graph display is provided in several data sections, noted as a "data G100", a "data G100_Net", a "data rect", and a "data Merged2" section. Another section of the TABLE 10 code comprises a specification of the graph layout, in the "proc template" section of code. The last section of TABLE 10 code initiates the rendering of the graph display, in the "ods graphics" section of code. Those skilled in the art will appreciate that some of the lines of code in TABLE 10, such as format specifications, process calls, and calls to an output display system (ods) and the like, are unique to the operating environment of the SAS system referred to above. Those skilled in the art will understand corresponding code that would be utilized in other graphing systems.

Additional examples of the polygon plot output are shown in FIGS. 15, 16, 17, 18, 19, 20, 21.

Figure 15:
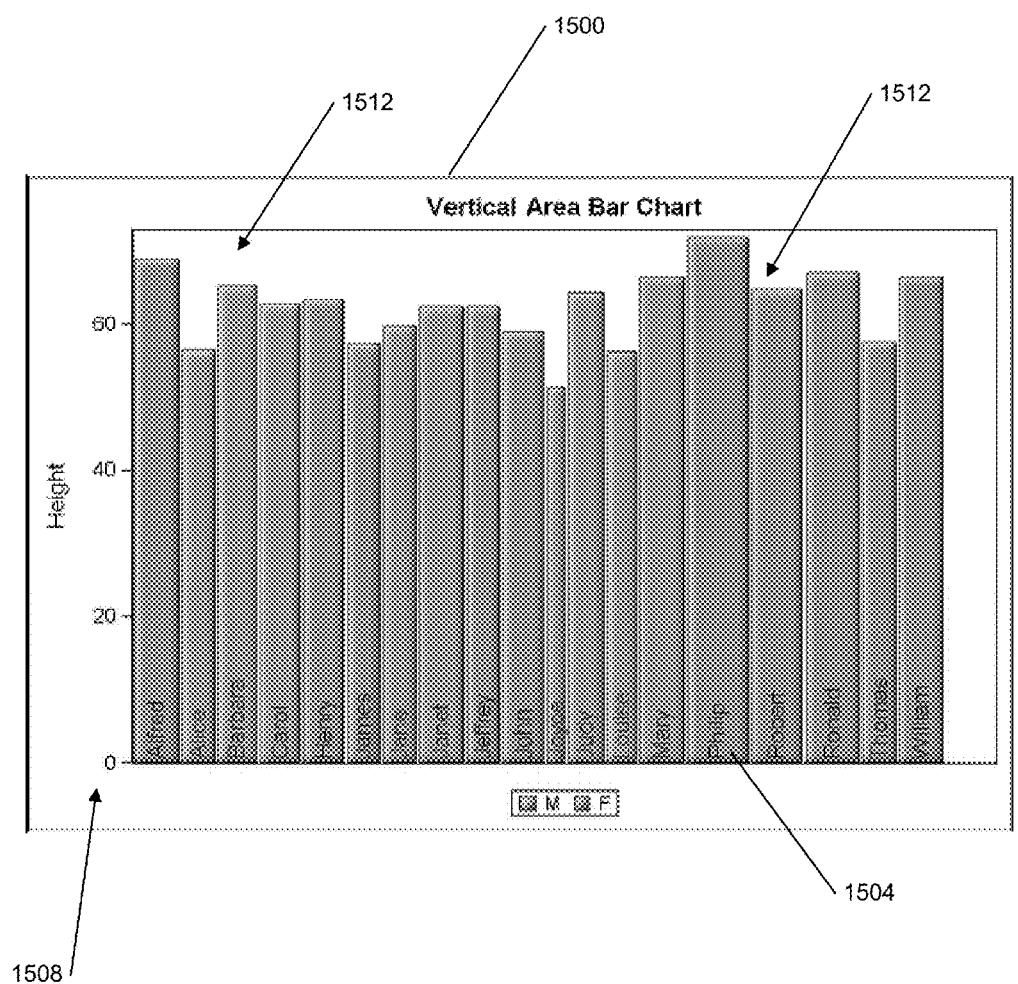
FIG. 15 illustrates an example of a display of the FIG. 1 computer processing system on which a graph is generated.

FIG. 15 shows a bar chart display 1500 of the computer system that illustrates an X-axis 1504 and a Y-axis 1508, with data arranged in vertical bars 1512. The data bars extend vertically, top to bottom, extending upwardly from the horizontal X-axis 1504. FIG. 15 shows that the plot statement described herein can be used to provide a graphing option, specified in the graphing request, to locate the group category values within the geometric shapes of the graph. Thus, in FIG. 15, the group category values are names of people for data responses in the dataset, which are located within the bars 1512 of the display. Moreover, FIG. 15 shows the flexibility of the system disclosed herein, in which the height and width of the bars may be specified and/or automatically provided for and scaled by, the graphing system. For example, in a typical bar chart, all bar widths are the same. In the FIG. 15 graph, the width of each bar is different, and is proportional to the weight of the named subject. The height of each bar is proportional to the height of the named subject. Each bar is placed to the right of the previous one, so the total data range on the X-axis is the SUM of the weights of all the subjects. This graph is produced using the POLYGON Plot statement. FIG. 15-18 show the flexible positioning option of labeling each polygon in a PolygonPlot.

Figure 16:
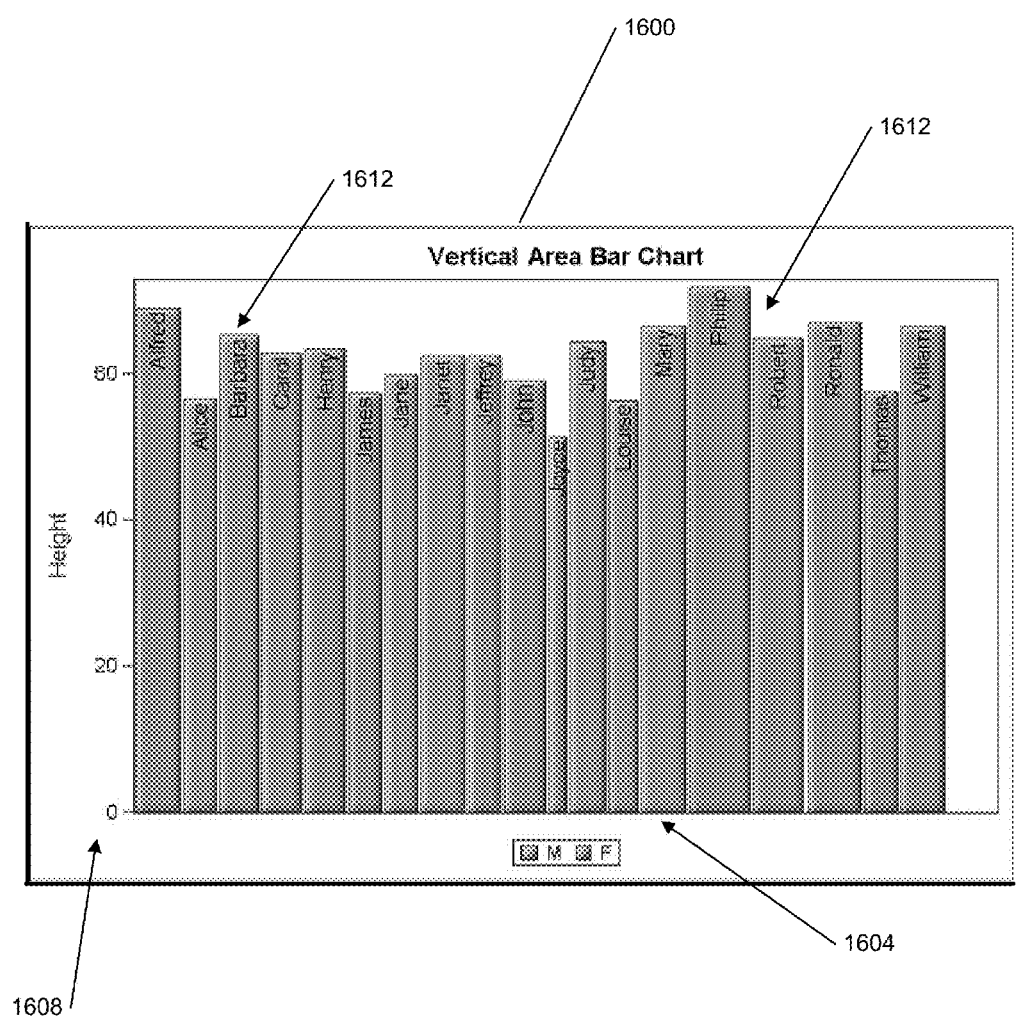
FIG. 16 illustrates an example of a display of the FIG. 1 computer processing system on which a graph is generated.

FIG. 16 shows a bar chart display 1600 of the computer system that illustrates an X-axis 1604 and a Y-axis 1608, with data arranged in vertical bars 1612. FIG. 16 is similar to that of FIG. 15, except that FIG. 16 shows that the plot statement can be used to provide a graphing option in which the text justification of the group category values is changed. In the case of the vertical bars of FIG. 15 and FIG. 16, the text alignment is shown in both a bottom end alignment (FIG. 15) and in a top end alignment (FIG. 16). Thus, the text within each bar may be justified at the bottom end (FIG. 15) or at the top end (FIG. 16), or anywhere in between. It should be understood that the data bars may be located to extend from the Y-axis rather than from the X-axis, and the axes of FIG. 15 and FIG. 16, and indeed the entire graph, may be rotated so that the bars (1512, 1612) extend horizontally left to right, rather than vertically top to bottom. The plot statement may be used to orient the data bars in a horizontal configuration, in which case the category value text within the bars may be left justified or right justified, or located anywhere in between.

Figure 17:
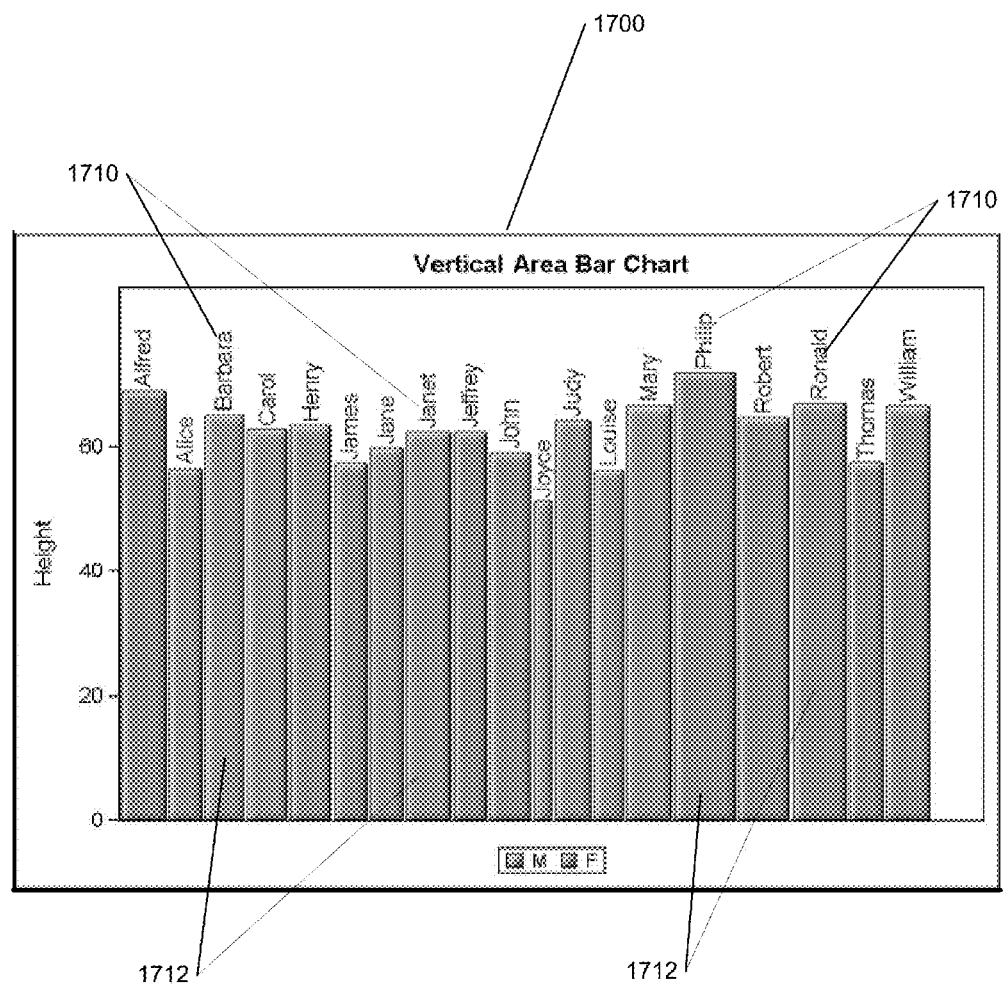
FIG. 17 illustrates an example of a display of the FIG. 1 computer processing system on which a graph is generated.

FIG. 17 shows additional display options that are available through the options that may be specified in the data display request. In FIG. 17, a bar graph 1700 is illustrated with the text comprising the category values located outside the area defined by a bar. That is, the area within a bar is clear of the category value.

Figure 18:
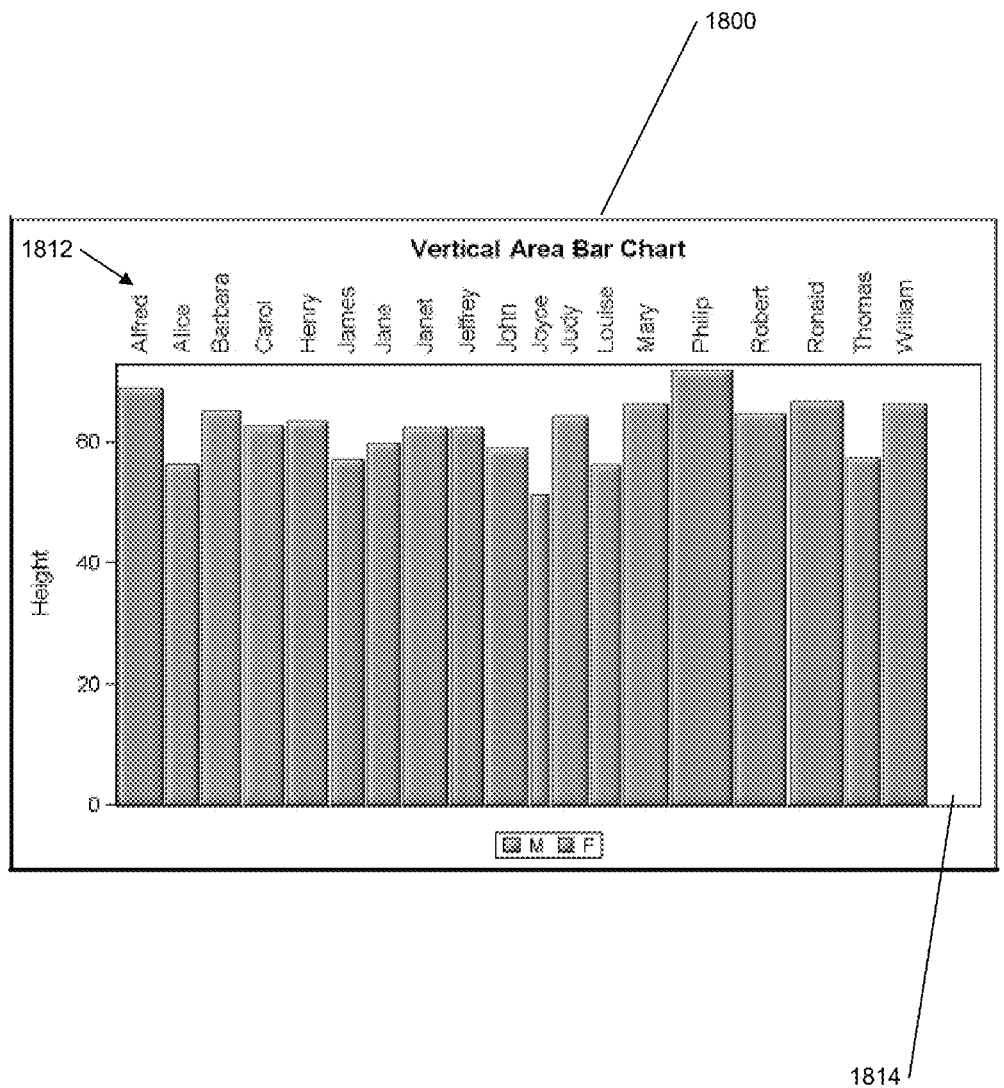
FIG. 18 illustrates an example of a display of the FIG. 1 computer processing system on which a graph is generated.

FIG. 18 shows additional display options that are available through the options that may be specified in the data display request. In FIG. 18, a bar graph 1800 is illustrated with the text comprising the category values located completely outside of the graph area. The category values are aligned opposite the X-axis of the graph display 1800; it should be noted that the category values could instead be located adjacent to the X-axis, below the bars themselves. The various display options illustrated herein, including the example data plots in FIGS. 8-18, may all be easily specified with the data request, such as a plot statement as described above.

The displays of FIGS. 15, 16, 17, and 18 all provide variations on bar charts, and may be initiated with the non-limiting example of command line code such as listed in TABLE 11 below:

TABLE 11

```
/*%let
gpath='\\sashq\root\dept\dvr\Patents\PolygonPlot_SAS_59744\Final\Image';*/
%let gpath='.';
%let dpi=200;
ods html close;
ods listing gpath=&gpath image_dpi=&dpi;
data class;
    label x='Weight' y='Height';
    keep x y id sex name Fullname;
    retain x 0 id 0 delta 10;
    length Fullname $20;
    set sashelp.class;
    FullName=strip(name) || ' Smith';
    id=id+1; y=0; output;
    y=height; output;
    x=x+weight-delta; output;
    y=0; output;
    x=x+delta;
    run;
/*proc print;run;*/
proc template;
    define statgraph PolyAreaBarChart;
        dynamic _skin _pos _loc _color;
        begingraph;
            entrytitle 'Vertical Area Bar Chart';
            layout overlay / yaxisopts=(offsetmin=0)
                    xaxisopts=(display=none);
                polygonplot x=x y=y id=id / group=sex name='a' display=(fill outline)
                    outlineattrs=(color=black) dataskin=_skin
                    label=name labelattrs=(color=_color size=10)
                    labelposition=_pos labellocation=_loc rotatelabel=vertical;
            discretelegend 'a';
            endlayout;
        endgraph;
    end;
run;
ods graphics / reset width=6in height=4in
imagename='FIG._15_PolyAreaBarChartVert1';
proc sgrender data=class template=PolyAreaBarChart;
    dynamic _skin="sheen" _pos="ymin" _loc="insidebbox";
run;
ods graphics / reset width=6in height=4in
imagename='FIG._16_PolyAreaBarChartVert2';
proc sgrender data=class template=PolyAreaBarChart;
    dynamic _skin="sheen" _pos="ymax" _loc="insidebbox" _color='black';
run;
ods graphics / reset width=6in height=4in
imagename='FIG._17_PolyAreaBarChartVert3';
proc sgrender data=class template=PolyAreaBarChart;
    dynamic _skin="sheen" _pos="ymax" _loc="outsidebbox";
run;
ods graphics / reset width=6in height=4in
imagename='FIG._18_PolyAreaBarChartVert4';
proc sgrender data=class template=PolyAreaBarChart;
    dynamic _skin="sheen" _pos="ymax" _loc="outside";
run;
proc template;
    define statgraph PolyAreaBarChart_Axis;
        dynamic _skin _pos _loc _color;
        begingraph;
            entrytitle 'Vertical Area Bar Chart';
            layout overlay / yaxisopts=(offsetmin=0);
```

TABLE 11-continued

```
        polygonplot x=x y=y id=id / group=sex name='a' display=(fill outline)
            outlineattrs=(color=black) dataskin=_skin
            label=name labelattrs=(color=_color size=10)
            labelposition=_pos labellocation=_loc rotatelabel=vertical;
        discretelegend 'a';
            endlayout;
            endgraph;
    end;
run;
ods graphics / reset width=6in height=4in
imagename='FIG._15_PolyAreaBarChartVertAxis';
proc sgrender data=class template=PolyAreaBarChart_Axis;
    dynamic _skin="sheen" _pos="ymin" _loc="insidebbox" _color='Black';
run;
```

In the TABLE 11 code above, after an initial section in which display and data parameters are provided, it can be seen that data for the graph display is provided in a "data class" data section. Another section of the TABLE 11 code comprises a specification of the graph layout, in the "proc template" section of code. The last section of TABLE 11 code initiates the rendering of the graph displays, in the "ods graphics" sections of code. Those skilled in the art will appreciate that some of the lines of code in TABLE 11, such as format specifications, process calls, and calls to an output display system (ods) and the like, are unique to the operating environment of the SAS system referred to above. Those skilled in the art will understand corresponding code that would be utilized in other graphing systems.

Figure 19:
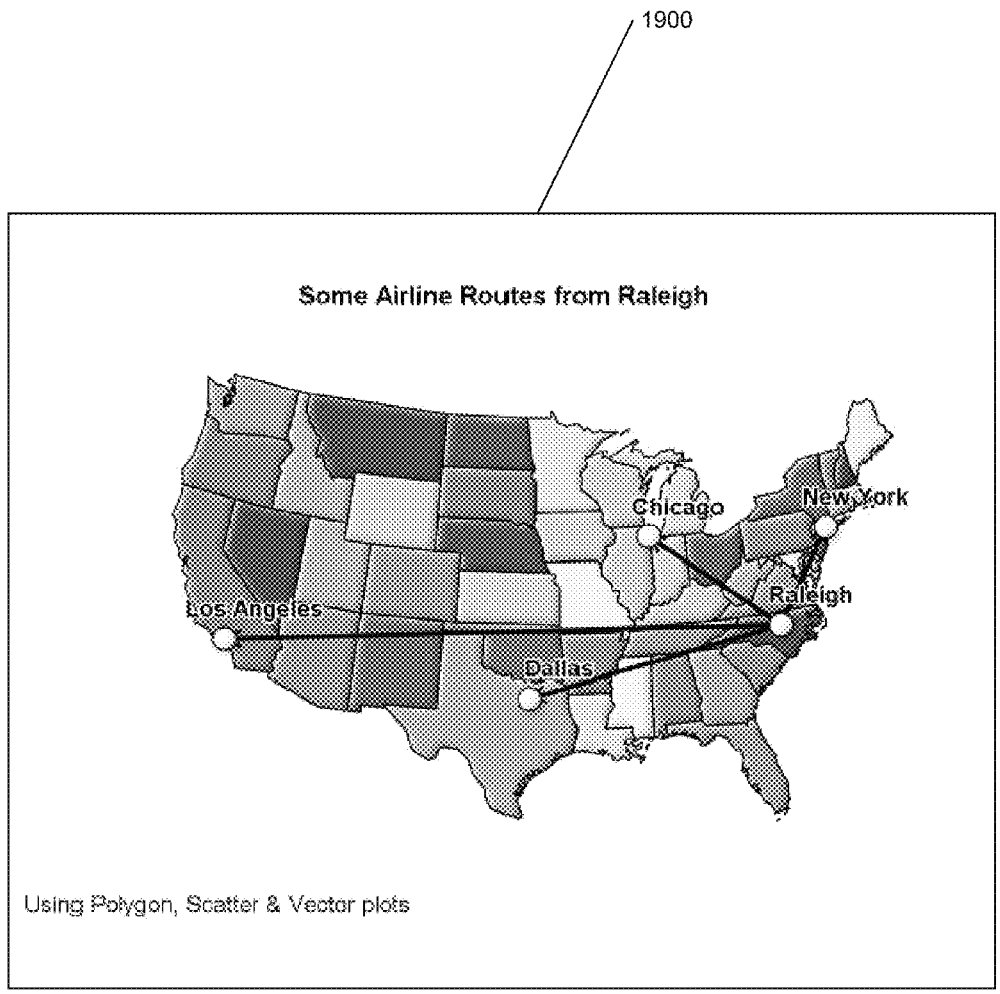
FIG. 19 illustrates an example of a display of the FIG. 1 computer processing system on which a graph is generated.

FIG. 19 illustrates a display 1900 of the computer system that shows the result of combining multiple plotting techniques. The combining may be specified in the graphing request, in view of the teachings described herein. FIG. 19 shows a plot including a map of the continental US, with particular graph scatter points corresponding to US cities and vectors connecting some of the cities. For example, airline routes are shown relative to the city of Raleigh, N.C. 1904 with arrows representing routes that connect from Raleigh to the cities of New York 1908, Chicago 1912, Los Angeles 1916, and Dallas 1920. The outlines of the various states may be specified by, for example, multiple polygons. In this way, relatively complex shapes may be constructed and illustrated in a plot, using one or more of the plot statement described herein. Thus, the geometric shapes of the FIG. 19 plot correspond to polygons that make up the geographical representation of the individual states. Although some relatively complicated shapes may require numerous polygons, the statements that can produce such shapes can be reused again and again, whenever the corresponding shape is desired.

As noted above, the GTL of SAS may be used to provide program code that, when executed, will specify graph displays, such as FIG. 19. The GTL of SAS provides an implementation with a command line interface, and can also be implemented and accessed via a GUI presentation on a computer display of the graphing computer system. To generate the graph display of FIG. 19, in command line format, for example, the code for generating the graph display may be initiated with the non-limiting example of command line code such as listed in TABLE 12 below to produce the graph plot of FIG. 19:

TABLE 12

```
%let gpath='.';
%let dpi=200;
ods html close;
ods listing gpath=&gpath image_dpi=&dpi;
/*--Close each segment polygon by repeating the first vertex--*/
/*--Remove Alsaka, Hawaii & Puerto Rico--*/
data usa;
    set maps.states(where=(density<=1 and (state not in(2, 15, 72))));
    length pid $8;
    keep state segment x y pid fips;
    by state segment;
    /*--Make unique Id for each state+segment combination--*/
    pid=put(state, 3.0) || put(segment, 3.0);
    Fips=state;
    run;
/*proc print;run;*/
proc sort data=usa;
    by fips segment;
    run;
data FipsUsa;
    input Fips StateCode $4-5 StateFull $7-30 Region $31-40;
    datelines;
1  AL  Alabama                 South
2  AK  Alaska                  NorthWest
4  AZ  Arizona                 SouthWest
5  AR  Arkansas                South
6  CA  California              SouthWest
8  CO  Colorado                SouthWest
9  CT  Connecticut             NorthEast
10 DE  Delaware                NorthEast
11 DC  District of Columbia    NorthEast
```

TABLE 12-continued

| | | |
|---|---|---|
| 12 | FL Florida | South |
| 13 | GA Georgia | South |
| 15 | HI Hawaii | West |
| 16 | ID Idaho | NorthWest |
| 17 | IL Illinois | MidWest |
| 18 | IN Indiana | MidWest |
| 19 | IA Iowa | MidWest |
| 20 | KS Kansas | MidWest |
| 21 | KY Kentucky | SouthEast |
| 22 | LA Louisiana | South |
| 23 | ME Maine | NorthEast |
| 24 | MD Maryland | NorthEast |
| 25 | MA Massachusetts | NorthEast |
| 26 | MI Michigan | MidWest |
| 27 | MN Minnesota | MidWest |
| 28 | MS Mississippi | South |
| 29 | MO Missouri | MidWest |
| 30 | MT Montana | NorthWest |
| 31 | NE Nebraska | MidWest |
| 32 | NV Nevada | SouthWest |
| 33 | NH New Hampshire | NorthEast |
| 34 | NJ New Jersey | NorthEast |
| 35 | NM New Mexico | SouthWest |
| 36 | NY New York | NorthEast |
| 37 | NC North Carolina | SouthEast |
| 38 | ND North Dakota | MidWest |
| 39 | OH Ohio | MidWest |
| 40 | OK Oklahoma | South |
| 41 | OR Oregon | NorthWest |
| 42 | PA Pennsylvania | NorthEast |
| 44 | RI Rhode Island | NorthEast |
| 45 | SC South Carolina | South |
| 46 | SD South Dakota | MidWest |
| 47 | Tm Tennessee | SouthEast |
| 48 | TX Texas | South |
| 49 | UT Utah | SouthWest |
| 50 | VT Vermont | NorthEast |
| 51 | VA Virginia | SouthEast |
| 53 | WA Washington | NorthWest |
| 54 | WV West Virginia | SouthEast |
| 55 | WI Wisconsin | MidWest |
| 56 | WY Wyoming | NorthWest |
| 72 | PR Puerto Rico | Pacific |

```
;
run;
data usa1;
   keep state segment x y pid fips StateCode StateFull Region;
   merge usa fipsusa;
   by fips;
run;
/*proc print data=usa1(obs=1000);run;*/
/*--Blank out state code and name for secondary segments--*/
data usa1a;
   set usa1;
   if segment ne 1 then do;
      statecode=''; statefull='';
/* if pid ne '';*/
   end;
run;
/*proc print;run;*/
/*ods listing;*/
/*proc print data=usa1a(obs=1000);run;*/
data usa2;
   set usa1a end=last;
   drop cony lat long;
   length city $12;
   conv=3.14159265 / 180;
   output;
   if last=1 then do;
      fips=.; statecode=''; statefull='';
      state=101; segment=1; density=0; pid=''; city='Raleigh'; lat=35+46/60; long=78+39/60;
      x=long*conv; y=lat*conv; output;
      state=102; segment=1; density=0; pid=''; City='New York'; lat=40+47/60; long=73+58/60;
      x=long*conv; y=lat*conv; output;
      state=103; segment=1; density=0; pid=''; City='Dallas'; lat=32+46/60; long=96+46/60;
      x=long*conv; y=lat*conv; output;
      state=104; segment=1; density=0; pid=''; City='Chicago'; lat=41+50/60;
```

TABLE 12-continued

```
long=87+37/60;
    x=long*conv; y=lat*conv; output;
        state=105; segment=1; density=0; pid=''; City='Los Angeles';lat=34+3/60;
long=118+15/60;
    x=long*conv; y=lat*conv; output;
    end;
run;
/*proc print;run;*/
/*--project map + city data--*/
proc gproject data=usa2 out=usap;
    id state;
run;
/*proc print;run;*/
/*--Find coordinates for Raleigh--*/
data _null_;
    set usap;
    if city='Raleigh' then do;
        call symput ('xo', x);
            call symput ('yo', y);
        end;
run;
/*--Separate city data from Map and set vector origins to Raleigh--*/
data usa3;
    set usap;
    d=0.03;
    xo=.; yo=.;
    if city ne '' then do;
        xc=x; yc=y; x=.; y=.; segment=.; state=.; xl=xc yl=yc+d;
        if city ne 'Raleigh' then do; xo=&xo; yo=&yo;
            end;
    end;
run;
proc print;run;
proc template;
    define statgraph AirlinePolyMap;
    dynamic _skin _color;
        begingraph / subpixel=on;
            entrytitle 'Some Airline Routes from Raleigh';
                entryfootnote halign=left 'Using Polygon, Scatter & Vector plots';
            layout overlayequated / xaxisopts=(offsetmax=0.05 display=none)
                    yaxisopts=(display=none) walldisplay=none;
                polygonplot x=x y=y id=pid / group=state display=(fill outline)
                    outlineattrs=(color=black) dataskin=_skin;
                polygonplot x=x y=y id=pid / display=(outline) outlineattrs=(color=black
thickness=1);
                vectorplot x=xc y=yc xorigin=xo yorigin=yo / lineattrs=(thickness=3);
                scatterplot x=xc y=yc / markerattrs=(symbol=circlefilled size=15)
                    filledoutlinedmarkers=true dataskin=sheen;
                scatterplot x=xl y=yl / markercharacter=city outlinedMarkerCharacters=true
                    markercharacterattrs=(size=10 weight=bold color=_color);
            endlayout;
        endgraph;
    end;
run;
ods graphics / reset width=6in height=4in
imagename='FIG._19_PolyMapAirlineSkinBlack'
            antialiasmax=4000 dataskinmax=2200 noborder;
proc sgrender data=usa3 template=AirlinePolyMap;
    dynamic _skin="sheen" _color='Black';
run;
```

In the TABLE 12 code above, after an initial section in which display and data parameters are provided, it can be seen that data for the shapes of the US states in the graph display are provided in the "data usa" data section. The data may be obtained from data storage of the computer system. This type of data retrieval illustrates the flexibility of the configuration provided by the POLYGONPLOT technique disclosed in this document. The stored shape data can be utilized in multiple graphing routines, and in that way comprises a library of shapes that are suitable for reuse. Additional data sections in TABLE 12 are noted as a "data Fipsusa", a "data usa1", a "data usa1a", a "data usa2", a "data null", and a "data usa3" section. Another section of the TABLE 12 code comprises a specification of the graph layout, in the "proc template" section of code. The last section of TABLE 12 code initiates the rendering of the graph display, in the "ods graphics" section of code. Those skilled in the art will appreciate that some of the lines of code in TABLE 12, such as format specifications, process calls, and calls to an output display system (ods) and the like, are unique to the operating environment of the SAS system referred to above. Those skilled in the art will understand corresponding code that would be utilized in other graphing systems.

Figure 20:
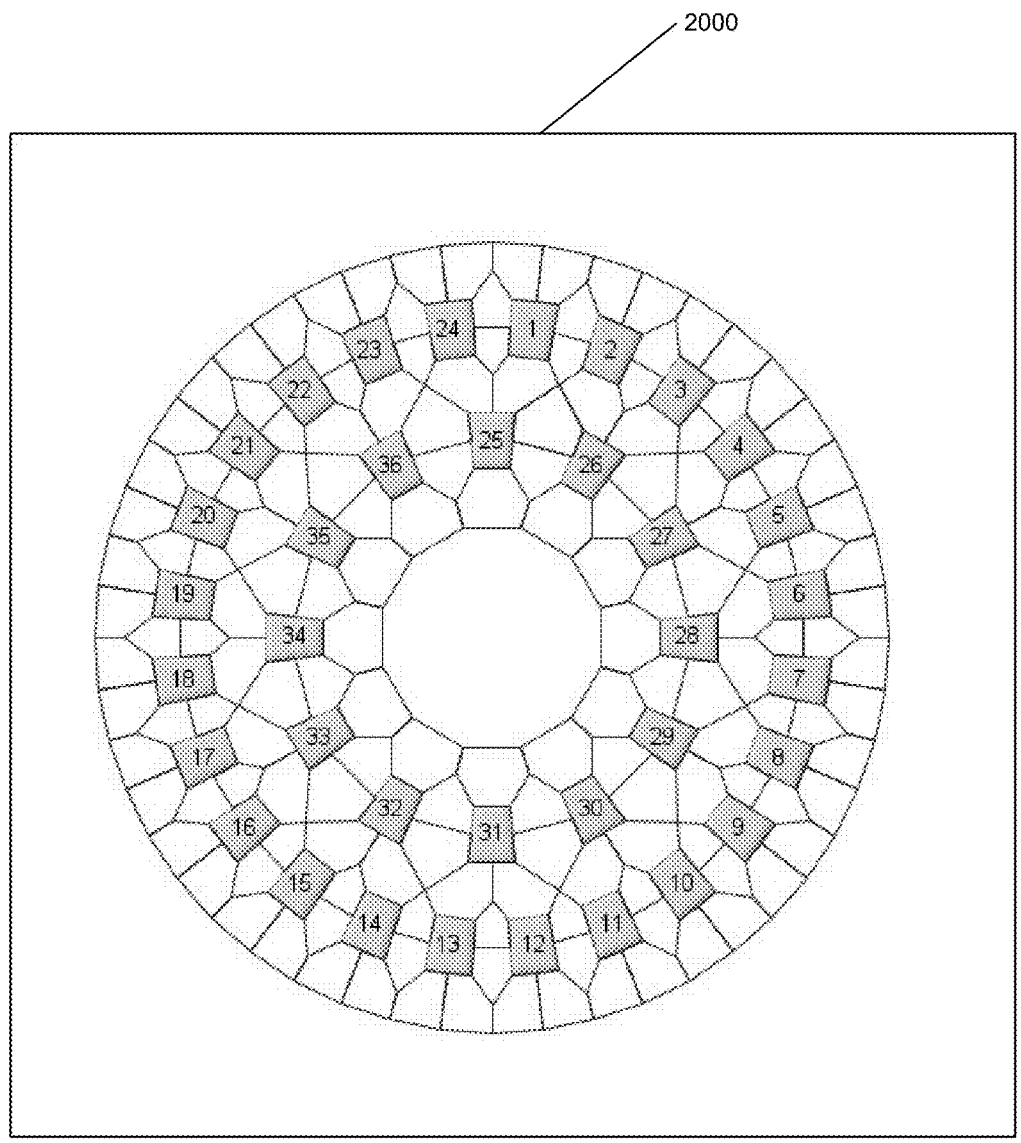
FIG. 20 illustrates an example of a display of the FIG. 1 computer processing system on which a graph is generated.

FIG. 20 illustrates a display 2000 of the computer system that shows a relatively elaborate plot having plot portions constructed of multi-polygon and pie chart segments arranged in a circular shape. FIG. 20 illustrates an example of a relatively complicated shape that can be generated using the PolygonPlot statement described herein. FIG. 20 is suited for the type of re-use noted above. For example, one basic element of the FIG. 20 plot that is repeated multiple times to generate the FIG. 20 plot can be utilized, and in this way, the PolygonPlot statement can be used to generate complicated plots. In this way, FIG. 20 combines element of pie charts and polygon plots, with text located within predetermined polygon portions. The locations of the various polygons and pie chart portions of FIG. 20 can be specified using offset values, as noted above.

Figure 21:
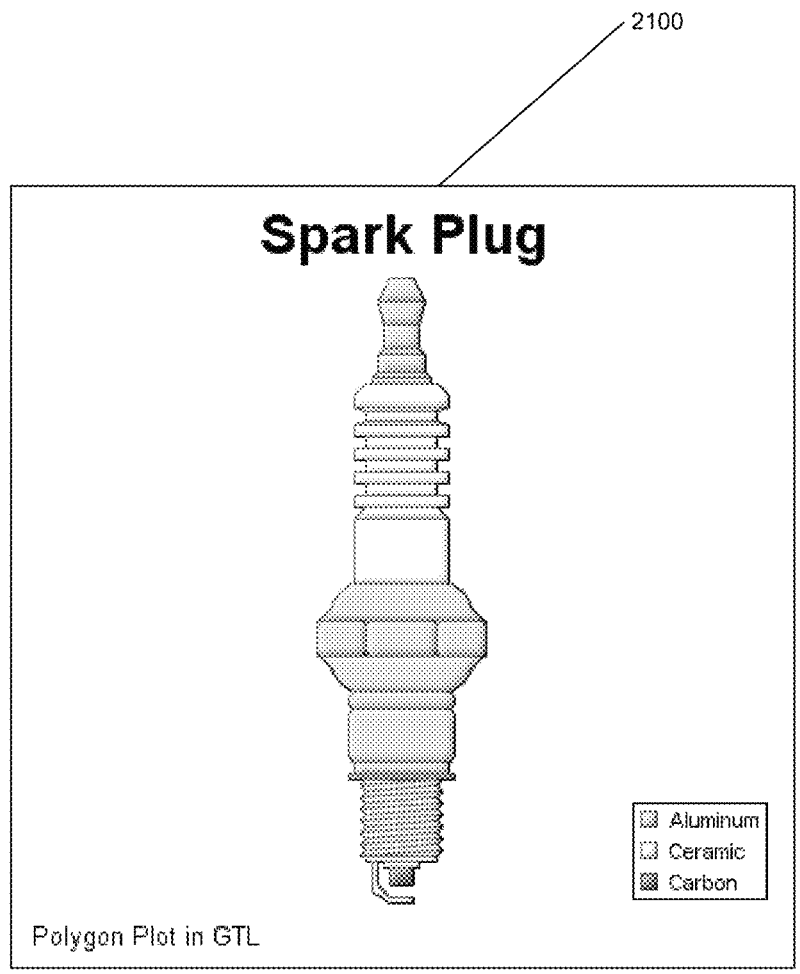
FIG. 21 illustrates an example of a display of the FIG. 1 computer processing system on which a graph is generated.

FIG. 21 illustrates a relatively elaborate plot 2100 having the appearance of a spark plug, formed with plot portions constructed of multi-polygon portions. As was the case with FIG. 19 and FIG. 20, the FIG. 21 display illustrates an example of a relatively complicated shape that can be generated using the PolygonPlot statement described herein. That is, the object depicted in FIG. 21 is suited for the type of re-use noted above. For example, FIG. 21 includes basic shapes that are repeated multiple times to generate the FIG. 21 plot, and in this way, the PolygonPlot statement can be used to generate complicated plots. The locations of the various basic shapes of FIG. 21 can be specified using offset values, as noted above.

Potential Uses for Aspects of the Disclosure.

Most "plot" statements in computer graphing systems create a specific representation of data so that all the data is represented and plotted in a regular, uniform way. As described herein, a computer graphing system according to this disclosure is able to process (x, y) data and generate data for rendering in a way such that each observation (i.e., each (x, y) pair of data) can be plotted in a specific way. This may be referred to as a scatterplot technique. Similarly, the computer graphing system may also use the same (x, y) data, but plot it as a connected line. In this way, each data response value is related to at least one prior data value. The same processing may be applied to all the plot statements described herein.

Each plot statement as described herein also is processed so that its data information is communicated via the indexes to the axes, so the appropriate amount of space for each plot can be allocated to the axes. The plots also may work with other graphing system objects such as the legends and attribute maps. The plots can be interleaved, as noted above. Other than the pie chart, each plot discussed is attached to, or associated with, a horizontal axis and vertical axis. Each axis asks for the data ranges of every plot that is attached this axis, merges the data ranges and creates a common (solitary) data range. It uses this common range to derive data-to-screen mapping.

On the other hand, the system may include an annotation facility that allows users to draw atomic-level graphical elements on top of the graph. These can be polygons, but these polygons neither communicate with the axes, the legends, nor do they work with the attribute maps. An annotate operation cannot be interleaved with the plot statements. For the commonly-known annotation tools such as the one offered by SAS/GTL, the annotation is drawn either on top of every plot or underneath of every plot.

Thus, the geometric plot described herein is a "hybrid" type of plot that provides a feature set between the typical plot statements and annotate statements of most computer graphing systems. The geometric plot may not create a specific representation of a graph. It instead renders a polygon as described by the user. In this attribute, it is similar to annotation. However, as a plot statement, it can interleave with other plot statements, interact with the axes and work with other GTL components like legends and attribute maps.

The Centered Pie chart described above helps to deliver part-to-whole information in a way that is easier for people to consume. Centering the pie on one of the four cardinal directions creates a simple, symmetric graph that is easy to understand.

The Hygrometer graph described above creates a unique graph that is useful to visualize data that can be represented as "opposites", but can still be aggregated. For example, "Sell" or "Buy" initiated stock volume, or "Arrival" versus "Departure" data. These can be seen individually as a proportion of the daily "volume". But their magnitudes can also be aggregated to contribute the daily (or over some interval) total. The individual bar of this graph "floats" at a level determined by the ratio of the positive to negative values, and can display the trend at-a-glance.

Embodiments

Systems and methods according to some examples may include data transmissions conveyed via networks (e.g., local area network, wide area network, Internet, or combinations thereof, etc.), fiber optic medium, wireless networks, etc. for communication with one or more data processing devices. The data transmissions can carry any or all of the data disclosed herein that is provided to, or from, a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The system and method data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, removable memory, flat files, temporary memory, databases, programming data structures, programming variables, IF-THEN (or similar type) statement constructs, etc.). It is noted that data structures may describe formats for use in organizing and storing data in databases, programs, memory, or other computer-readable media for use by a computer program.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows and figures described and shown in this specification can be performed by one or more programmable processors executing one or more computer programs to perform functions by operating on input data and generating output.

Generally, a computer can also include, or be operatively coupled to receive data from or transfer data to, or both, one or more mass storage devices for storing data (e.g., magnetic, magneto optical disks, or optical disks). However, a computer need not have such devices. Moreover, a computer can be embedded in another device, (e.g., a mobile telephone, a personal digital assistant (PDA), a tablet, a mobile viewing device, a mobile audio player, a Global Positioning System (GPS) receiver), to name just a few. Computer-readable media suitable for storing computer program instructions and data include all forms of nonvolatile memory, media and memory devices, including by way of example semiconductor memory devices (e.g., EPROM, EEPROM, and flash memory devices); magnetic disks (e.g., internal hard disks or removable disks; magneto optical disks; and CD ROM and DVD-ROM disks). The processor and the memory can be supplemented by, or incorporated in, special purpose logic circuitry.

The computer components, software modules, functions, data stores and data structures described herein may be connected directly or indirectly to each other in order to allow the flow of data needed for their operations. It is also noted that a module or processor includes, but is not limited to, a unit of code that performs a software operation, and can be implemented, for example, as a subroutine unit of code, or as a software function unit of code, or as an object (as in an object-oriented paradigm), or as an applet, or in a computer script language, or as another type of computer code. The software components or functionality may be located on a single computer or distributed across multiple computers depending upon the situation at hand.

The computer may include a programmable machine that performs high-speed processing of numbers, as well as of text, graphics, symbols, and sound. The computer can process, generate, or transform data. The computer includes a central processing unit that interprets and executes instructions; input devices, such as a keyboard, keypad, or a mouse, through which data and commands enter the computer; memory that enables the computer to store programs and data; and output devices, such as printers and display screens, that show the results after the computer has processed, generated, or transformed data.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products (i.e., one or more modules of computer program instructions encoded on a computer-readable medium for execution by, or to control the operation of, data processing apparatus). The computer-readable medium can be a machine-readable storage device, a machine-readable storage substrate, a memory device, a composition of matter effecting a machine-readable propagated, processed communication, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question (e.g., code that constitutes processor firmware, a protocol stack, a graphical system, a database management system, an operating system, or a combination of one or more of them).

While this disclosure may contain many specifics, these should not be construed as limitations on the scope of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be utilized. Moreover, the separation of various system components in the implementations described above should not be understood as requiring such separation in all implementations, and it should be understood that the described program components and systems can generally be integrated together in a single software or hardware product or packaged into multiple software or hardware products.

Some systems may use Hadoop®, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop® is an open-source software framework for distributed computing. Some systems may use the SAS® LASR™ Analytic Server in order to deliver statistical modeling and machine learning capabilities in a highly interactive programming environment, which may enable multiple users to concurrently manage data, transform variables, perform exploratory analysis, build and compare models and score. Some systems may use SAS In-Memory Statistics for Hadoop® to read big data once and analyze it several times by persisting it in-memory for the entire session.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situations where only the disjunctive meaning may apply.

What is claimed is:

1. A graphing computer system comprising:
a processor; and
a non-transitory computer-readable storage medium that includes instructions that are configured to be executed by the processor such that, when executed, the instructions cause the graphing computer system to perform operations including:
receiving a request at the graphing computer system to display a geometric plot having at least two axes, wherein an axis of the at least two axes has one or more non-ordinal categorical index values, and wherein the request specifies a dataset including at least three vertices that define a shape to be displayed in the geometric plot, the shape being rotatable at any angle within the geometric plot;
using the dataset to generate first display data corresponding to a first location of a first vertex, wherein the first vertex is generated at a first non-ordinal categorical index value of the axis plus or minus a first fractional distance relative to the first non-ordinal categorical index value along the axis;
using the dataset to generate second display data corresponding to a second location of a second vertex, wherein the second vertex is generated at a second non-ordinal categorical index value of the axis plus or minus a second fractional distance relative to the second non-ordinal categorical index value along the axis; and
transmitting the first and second display data to a graphing engine to facilitate display of the shape on the geometric plot.

2. The graphing computer system of claim 1, wherein the dataset comprises a table of alphanumeric data, and wherein the non-ordinal categorical index values comprise values that are non-numerical.

3. The graphing computer system of claim 1, wherein the shape is a polygon and the dataset is provided as user input.

4. The graphing computer system of claim 1, wherein the dataset of the request specifies a plurality of polygons for the geometric plot.

5. The graphing computer system of claim 1, wherein the dataset of the request specifies an angle at which the shape is to be rotated within the geometric plot about a central point of the shape.

6. The graphing computer system of claim 1, wherein the dataset of the request includes data values for multiple variables.

7. The graphing computer system of claim 1, wherein the dataset of the request specifies an angle of rotation for each polygon of the geometric plot, such that the angle of rotation is independent of the remaining polygons of the geometric plot, and such that the angle of rotation indicates a data value in the dataset.

8. The graphing computer system of claim 7, wherein the angle of rotation is represented by two or more colors.

9. The graphing computer system of claim 1, wherein the geometric plot includes a first axis and a second axis that is perpendicular to the first axis, and wherein the first axis or the second axis is the axis that has the one or more non-ordinal categorical index values.

10. The graphing computer system of claim 1, wherein each vertex of the at least three vertices is specified by a value and a fractional distance relative to a non-ordinal categorical index value.

11. The graphing computer system of claim 9, wherein the first axis and the second axis both have discrete, categorical index values.

12. The graphing computer system of claim 1, wherein the dataset specifies independent angles of rotation for multiple geometric shapes.

13. The graphing computer system of claim 1, wherein the shape comprises an arrowhead polygon that is filled in with a color, the color indicating a data value in the dataset.

14. The graphing computer system of claim 1, wherein the dataset is specified in response to a plurality of requests to generate the geometric plot, and wherein the graphing engine is further configured to generate the geometric plot such that the geometric plot includes multiple shapes specified in the plurality of requests.

15. The graphing computer system of claim 14, wherein at least one of the shapes specified in the plurality of requests comprises a heat map formed from a plurality of polygon shapes corresponding to a plurality of categories, and wherein at least two polygon shapes in the plurality of polygon shapes represent different data values having different magnitudes.

16. The graphing computer system of claim 15, wherein the different data values are represented by different corresponding colors.

17. The graphing computer system of claim 1, wherein the request specifies an angle of rotation for shape, and the angle of rotation indicates a magnitude value.

18. A computer-program product tangibly embodied in a non-transitory machine-readable storage medium, including instructions configured to be executed to cause a graphing computer system to perform a method comprising:
receiving a request at the graphing computer system to display a geometric plot having at least two axes, wherein an axis of the at least two axes has one or more non-ordinal categorical index values, and wherein the request specifies a dataset including at least three vertices that define a shape to be displayed in the geometric plot, the shape being rotatable at any angle within the geometric plot;
using the dataset to generate first display data corresponding to a first location of a first vertex, wherein the first vertex is generated at a first non-ordinal categorical index value of the axis plus or minus a first fractional distance relative to the first non-ordinal categorical index value along the axis;
using the dataset to generate second display data corresponding to a second location of a second vertex, wherein the second vertex is generated at a second non-ordinal categorical index value of the axis plus or minus a second fractional distance relative to the second non-ordinal categorical index value along the axis; and
transmitting the first and second display data to a graphing engine to facilitate display of the shape on the geometric plot.

19. The computer-program product of claim 18, wherein the shape is a polygon and the dataset is provided as user input.

20. The computer-program product of claim 18, wherein the dataset of the request specifies an angle of rotation for each polygon of the geometric plot, such that the angle of rotation is independent of the remaining polygons of the geometric plot, and such that the angle of rotation indicates a data value in the dataset.

21. The computer-program product of claim 20, wherein the angle of rotation is represented by two or more colors.

22. The computer-program product of claim 18, wherein each vertex of the at least three vertices is specified by a value and a fractional distance relative to a non-ordinal categorical index value.

23. The computer-program product of claim 18, wherein the dataset specifies independent angles of rotation for multiple geometric shapes.

24. The computer-program product of claim 18, wherein the shape comprises an arrowhead polygon that is filled in with a color, the color indicating a data value in the dataset.

25. The computer-program product of claim 18, wherein the shape comprises a heat map formed from a plurality of polygon shapes corresponding to a plurality of categories, and wherein at least two polygon shapes in the heat map represent different data values having different magnitudes.

26. The computer-program product of claim 18, wherein the request specifies an angle of rotation for the shape, and the angle of rotation indicates a magnitude value.

27. A method of operating a graphing computer system, the method comprising:
    receiving, by a processor, a request at the graphing computer system to display a geometric plot having at least two axes, wherein an axis of the at least two axes has one or more non-ordinal categorical index values, wherein the request specifies a dataset including at least three vertices that define a shape to be displayed in the geometric plot;
    determining, by the processor, whether the request specifies an angle at which the shape is to be rotated within the geometric plot, the shape being rotatable in any amount within the geometric plot;
    using, by the processor, the dataset to generate first display data corresponding to a first location of a first vertex, wherein the first vertex is generated at a first non-ordinal categorical index value of the axis plus or minus a first fractional distance relative to the first non-ordinal categorical index value along the axis;
    using, by the processor, the dataset to generate second display data corresponding to a second location of a second vertex, wherein the second vertex is generated at a second non-ordinal categorical index value of the axis plus or minus a second fractional distance relative to the second non-ordinal categorical index value along the axis;
    transmitting, by the processor, the first and second display data to a graphing engine to facilitate display of the shape on the geometric plot; and
    displaying, by the processor and via a display device, the shape rotated at the angle within the geometric plot when the request specifies the angle; or
    displaying, by the processor and via the display device, the shape in a default orientation within the geometric plot when the request does not specify the angle.

28. The method of claim 27, wherein the shape is a polygon, and wherein the dataset is provided as user input.

29. The method of claim 27, wherein the dataset of the request specifies an angle of rotation for each polygon of the geometric plot, such that the angle of rotation is independent of the remaining polygons of the geometric plot, and such that the angle of rotation indicates a data value in the dataset.

30. The method of claim 29, wherein the angle of rotation is represented by two or more colors.

31. The method of claim 27, wherein each vertex of the at least three vertices is specified by a value and a fractional distance relative to a non-ordinal categorical index value.

32. The method of claim 27, wherein the dataset specifies independent angles of rotation for multiple geometric shapes.

33. The method of claim 27, wherein the shape comprises an arrowhead polygon that is filled in with a color, the color indicating a data value in the dataset.

34. The method of claim 27, wherein the shape comprises a heat map formed from a plurality of polygon shapes corresponding to a plurality of categories, and wherein at least two polygon shapes in the heat map represent different data values having different magnitudes.

35. The method of claim 27, wherein the request specifies an angle of rotation for the shape, and the angle of rotation indicates a magnitude value.

36. The method of claim 27, wherein the shape is in the default orientation when the shape is aligned with an axis that is positioned perpendicular to the axis that has the one or more non-ordinal categorical index values.

\* \* \* \* \*